(12) United States Patent
Quinonez et al.

(10) Patent No.: US 10,821,633 B1
(45) Date of Patent: Nov. 3, 2020

(54) 3D PRINTED AIRTIGHT INSULATED OBJECTS USING FUSED DEPOSITION MODELING

(71) Applicant: Kemeera Inc., Oakland, CA (US)

(72) Inventors: Carlo Quinonez, Oakland, CA (US); Sebastian Morales Prado, Brooklyn, NY (US)

(73) Assignee: Kemeera Inc., Oakland, CA (US)

( * ) Notice: Subject to any disclaimer, the term of this patent is extended or adjusted under 35 U.S.C. 154(b) by 269 days.

(21) Appl. No.: 15/813,050

(22) Filed: Nov. 14, 2017

Related U.S. Application Data

(60) Provisional application No. 62/421,967, filed on Nov. 14, 2016.

(51) Int. Cl.
*B29C 41/36* (2006.01)
*B29C 41/12* (2006.01)
*G06T 17/10* (2006.01)
*B29C 64/106* (2017.01)

(52) U.S. Cl.
CPC .............. *B29C 41/36* (2013.01); *B29C 41/12* (2013.01); *B29C 64/106* (2017.08); *G06T 17/10* (2013.01)

(58) Field of Classification Search
CPC ....... B29C 41/36; B29C 64/106; B29C 41/12; G06T 17/10
See application file for complete search history.

*Primary Examiner* — Robert J Grun
(74) *Attorney, Agent, or Firm* — Haynes Beffel & Wolfeld, LLP; Ernest J. Beffel, Jr.

(57) ABSTRACT

We disclose methods for, devices that implement, and structures produced by 3D printing of insulating and airtight walls using fused deposition modeling printers. Several disclosed methods and features contribute to insulating and airtight walls. These can be used individually or in combination. Structures that reduce or eliminate horizontal surfaces through the use of overlying cantilevered contours can be combined with continuous structures that penetrate through multiple layers, selective overfilling, offset joints and additional extrusions to mitigate leakage routes. Self-supporting closed cell structures can be built that form insulating regions by controlling convective losses.

16 Claims, 23 Drawing Sheets

736

3D PRINTED AIRTIGHT INSULATED OBJECTS USING FUSED DEPOSITION MODELING

CROSS REFERENCE

This application claims the benefit of U.S. Provisional Patent Application No. 62/421,967, entitled "3D PRINTED AIRTIGHT INSULATED OBJECTS USING FUSED DEPOSITION MODELING", filed Nov. 14, 2016. The provisional application is hereby incorporated by reference for all purposes.

FIELD OF THE INVENTION

The technology disclosed relates to tooling and techniques for fabricating 3D printed airtight parts using fused deposition modeling.

BACKGROUND OF THE INVENTION

Fused deposition modeling is the most popular 3D printing technology in use today. It works by laying down or depositing melted material in layers via an extrusion head containing a heated nozzle assembly, often referred to as the "tool," over a moveable table that is positioned under the nozzle. As the melted material is deposited, it fuses with adjacent material that has been previously deposited. The material is a thermoplastic supplied as a coil of filament. Fused deposition modeling printers control the movement of the table in the Z-axis (vertical), the tool in the XY-axis (horizontal plane), the nozzle temperature, and other parameters to deposit melted material along a tool path to form layers of differing shapes and thickness. Multiple layers are built up successively to form a finished object. This approach of adding material to build an object is called additive manufacturing.

Initially, 3D printers were used mostly for decorative objects. However, with the advent of newer materials it is now possible to use fused deposition modeling to make functional parts that have many advantages. They are durable and retain functionality at a wide range of temperatures and in the presence of many different chemicals. Parts can be built separately and bonded together to form a part of much larger size than the capacity of a given 3D printer. Fused deposition modeling printers are widely available in all price ranges and sizes.

The infrastructure required for 3D fused deposition modeling printing is minimal: a 3D printer and the raw material. Functional parts can be fabricated at a remote location such as a geographically isolated area, even on a space station, the moon or another planet where it may be impractical or impossible to deploy machinery. Digital information describing a part can be sent via a communications link to a 3D printer and the part can be manufactured on site. The digital information may describe the actual tool path and parameters to 3D print a part, or it can be processed digitally to produce this information in a format that can be read by a 3D printer.

However, information is lost as an original design file is converted from solid geometry to the code to control a 3D printer. Owing to this quantization and grid snap transformation, compounded by the physical limitations of the hardware and material, all 3D fused deposition modeling printed parts are inherently imperfect. This imperfection is manifested as gaps or voids in the extruded material within layers and between layers. These gaps form leakage paths through which a fluid, gas or liquid, can escape.

Given the many advantages of fused deposition modeling, it would be desirable to mitigate these leakage paths during the printing process in order to fabricate airtight parts that can be used to contain fluids and as insulation to moderate the thermal properties of a part. Thus, an opportunity arises to modify tool paths and hardware control parameters to address the inherent shortcomings of fused deposition modeling to fabricate 3D printed parts that are airtight or contain airtight compartments.

SUMMARY

We disclose methods for, devices that implement, and structures produced by 3D printing of insulating and airtight walls using fused deposition modeling printers. Several disclosed methods and features contribute to insulating and airtight walls. These can be used individually or in combination. Structures that reduce or eliminate horizontal surfaces through the use of overlying cantilevered contours can be combined with continuous structures that penetrate through multiple layers, selective overfilling, offset joints and additional extrusions to mitigate leakage routes. Self-supporting closed cell structures can be built that form insulating regions by controlling convective losses.

Additional 3D printing features and material properties are described.

The above summary is provided in order to provide a basic understanding of some aspects of the technology disclosed. This summary is not intended to identify key or critical elements of the technology disclosed or to delineate the scope of the technology disclosed. Its sole purpose is to present some concepts of the technology disclosed in a simplified form as a prelude to the more detailed description presented below. Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1A:
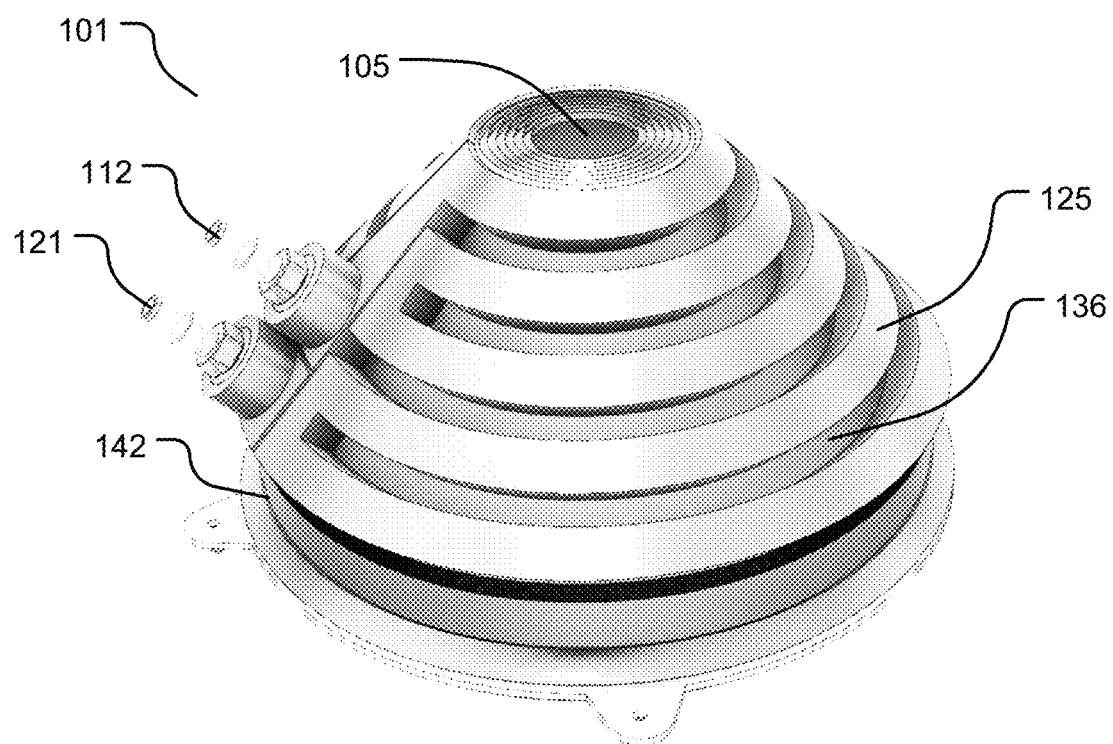
FIGS. 1A and 1B show an example of a finished product made using the technology disclosed: an insulated airtight environmental chamber.

The following description is presented with reference to the figures to enable any person skilled in the art to make and use the technology disclosed, and is provided in the context of particular applications and their requirements. Various modifications and equivalent variations to the disclosed embodiments will be readily apparent to those skilled in the art, and the general principles defined herein may be applied to other embodiments and applications without departing from the spirit and scope of the disclosure. Thus, the technology disclosed is not intended to be limited to the embodiments shown, but is to be accorded with the widest scope consistent with the principles and features disclosed herein.

Unless otherwise stated, in this application specified relationships, such as parallel to, aligned with, or in the same plane as, mean that the specified relationships are within limitations of manufacturing processes and within manufacturing variations. Additionally, terms such as upper, lower, top, bottom, left, right, rear, front, below, above may be used in the description and claims to aid understanding of the technology disclosed and not used in a limiting sense. Like elements in various embodiments are referred to with like reference numerals.

Overview 3D fused deposition modeling printing is considered one of the best types of 3D printing technologies for making durable, functional parts. The infrastructure required for 3D printing is minimal: a 3D printer and the raw material. Digital information describing a part can be sent via a communications link to a 3D printer and the part can be manufactured on site. The digital information used for fused deposition modeling printing describes tool paths and parameters to 3D print a part. A model of a part is processed digitally to output a build file that stores this digital information in a format that drives a 3D printer.

Functional parts can be fabricated at a remote location such as a geographically isolated area, even on a space station, the moon or another planet where it may be impractical or impossible to deploy machinery. 3D fused deposition modeling printing could also be used in a disaster situation to manufacture replacement parts when traditional machinery is unavailable. In 3D fused deposition modeling printing, material is "added" to build a part versus removing material as is the case with subtractive machining technologies.

Yet, with these advantages, it is difficult or impossible to produce airtight or insulated parts with current 3D fused deposition modeling printing techniques because of problems inherent in the overall process. Before explaining how the technology disclosed solves these problems, it will be useful to explore their nature and underlying causes.

The fused deposition modeling 3D printing process begins with a digital representation of an object as a geometric solid, usually created with CAD/CAM (computer aided design/computer aided manufacturing) software, and ends with a physical instantiation of the object built layer-by-layer from filaments or "strands" of thermopolymer using a fused deposition modeling 3D printer. This translation from digital information stored as data in a computer file to a physical object involves several conversions.

Information is lost throughout this conversion process: a solid body representation of an object is converted to a surface geometry representation in which the shape of the object is approximated with triangles. For instance, curves are replaced by a series of connected line segments, each of which is an edge of a triangle that is part of a triangular mesh. An STL file stores the triangular mesh that represents the surface geometry of the object.

The STL file, is then input to a slicer server that runs slicer software that "slices" the triangular mesh into a stack of layers that represent the object. Each layer has a finite thickness dependent on the filament material, the hardware and the parameters that control the extrusion process. Thus, this stack of layers approximates shapes except for cases in which the edge of a shape aligns with the Z-axis, which is vertical to the print bed. FIG. 4D shows the gaps 463 that result when shape 445 in FIG. C is sliced. The effect illustrated by the gaps 463 is called "staircasing" because of its resemblance to a flight of stairs. This is similar to the gaps 423 and 473 in FIGS. 4A and 4B that result from using raster fill patterns to approximate the space between contours.

Lastly, after the slicing operation, this stack of layers is converted to a build file that contains the instructions to control and direct a 3D printer to extrude material to build the physical object. Thus, owing to the information lost in converting as solid geometry to a build file, plus the physical limitations of the 3D printer hardware and the filament itself, an original CAD/CAM design is approximated by the 3D fused deposition modeling printing process. Hence, 3D fused deposition modeling printed parts are inherently imperfect.

This imperfection is manifested as gaps or voids in the extruded material within layers and between layers. These gaps form leakage paths through which a fluid, gas or liquid, can escape, thus rendering the 3D fused deposition modeling process unsuitable for producing insulated airtight parts or components.

The technology disclosed solves this problem by combining structures that reduce or eliminate horizontal surfaces with continuous structures that penetrate through multiple layers, selective overfilling, offset joints and additional extrusions. Additionally, self-supporting essentially closed cell structures can be incorporated to form an insulating structure to moderate thermal properties by controlling convective losses. These essentially closed cells insulate convection of their enclosed gas from ambient gas circulation.

A practical implementation of the technology disclosed, an environmental chamber FIG. 1A, was fabricated using this technology. The chamber was designed to eliminate horizontal raster fill patterns since they are much more subject to leaks. FIG. 1C shows how a "flat" bottom plate was redesigned with "V" shaped sloping surfaces 145 with a cross section as in FIG. 1D resembling open triangles 184 to eliminate a flat horizontal surface. We describe this as a "triangulated three dimensional surface." In this example, several "V" shaped sloping surfaces are nested and fused together to span the distance between the outer or most distal contours to form a continuous surface that has no raster fill, thus eliminating the gaps inherent in raster fill patterns as illustrated in FIG. 3.

Figure 3:
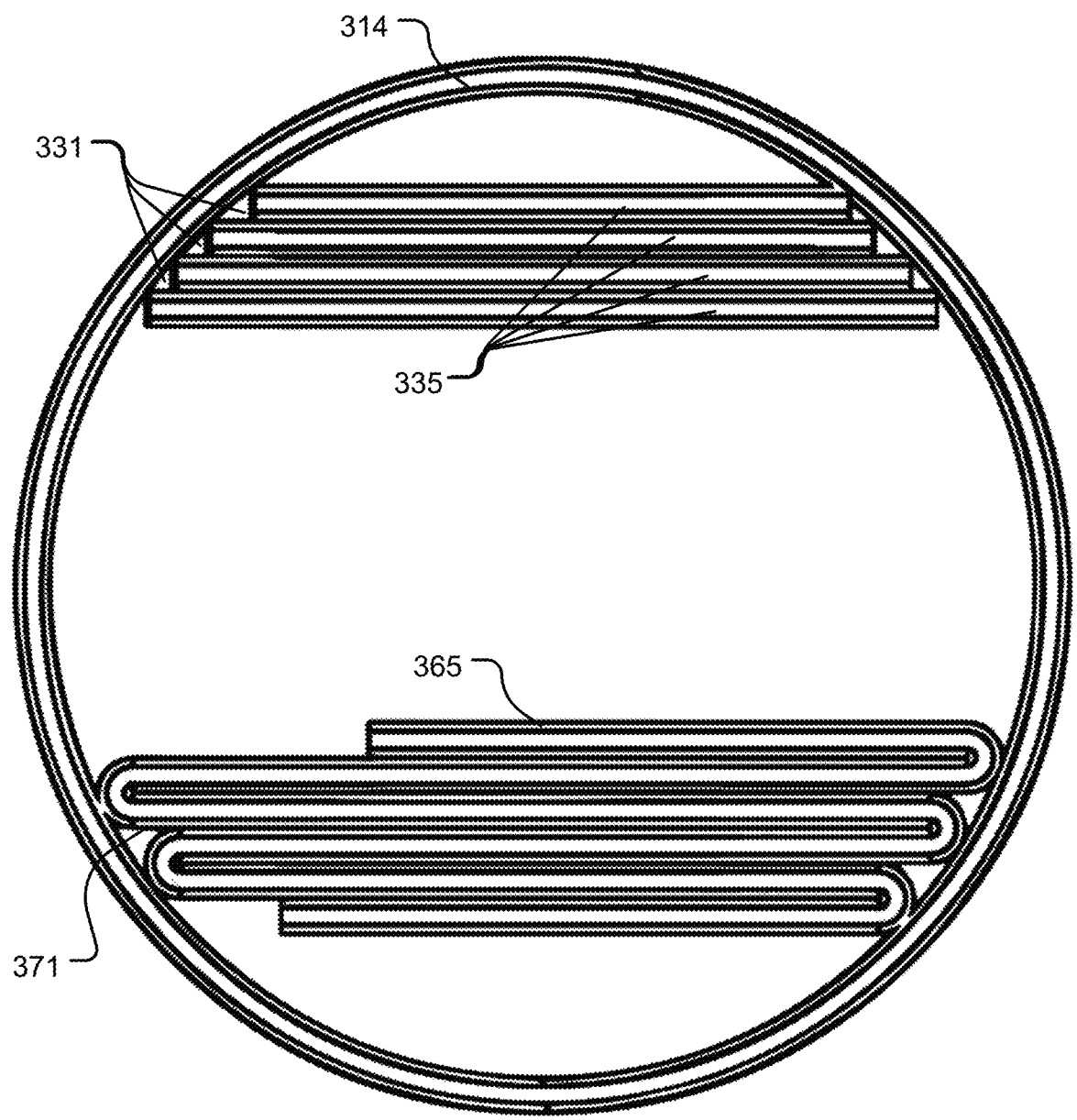
FIG. 3 shows a top view of how discontinuous tool paths 331 are connected to form a continuous tool path 365.

The rationale for using is that most "slicers," the software that converts an STL file from its triangular mesh representation of an object to a stack of layers, use a strategy that represents the outer or exposed surfaces of a body as "contours" and the spaces between them as "rasters." Thus, a flat horizontal surface would be outlined by one or more coplanar contours and then filled using a raster fill pattern as in FIG. 3.

Physically, the contours are the strands of filament that are extruded to outline the surfaces of an object or part. A strand, after it has been extruded or deposited is called a "road."

The roads that fill the space on each layer between the contours on that layer are called "rasters" and are deposited in various patterns. The default pattern used by most slicers is a continuous zigzag or serpentine pattern of roads which bend back upon themselves when they contact a contour. This is called a "raster" pattern and each road is called a "raster." The overall raster pattern is referred to as "raster fill." Examples are shown in FIG. 3.

When a raster touches a contour, a small gap 331 and 371 often forms as shown in FIG. 3. This gap results when a solid geometry object representation is converted into a tool path. When CAD/CAM software converts or exports its solid geometry part representation to an STL (stereolithography) file information is lost as only the object's surfaces are represented. An STL file uses triangulated meshes, i.e. triangles connected along their edges or vertices, to represent the surfaces of a part or object and hence it can only approximate continuous curves present in the CAD/CAM file.

The STL file is now be converted to a sequence of machine readable instructions, called a build file, which is read by a 3D printer to produce the object. 3D printer build files are similar to those used in CNC (computer numerical control) machines. Since 3D fused deposition modeling printers deposit their material in layers, the surface geometry of an STL file is sliced into a stack of layers using "slicer" software. Every layer has a finite thickness and is deposited successively, curves or straight lines that cross multiple layers and are not aligned with the vertical axis or Z-axis of the print bed can only be approximated as a "staircased" profile. The resolution of this approximation depends upon the thickness of a layer.

Although the details of the various conversions are dependent upon the specific CAD/CAM and slicer software used, the overall process remains: a solid geometry description is converted to a mesh which is in turn converted to a build file containing 3D printer specific machine instructions which describe how each layer of molten material is extruded and placed on the preceding layer. Imperfections are introduced throughout this process and fall into two categories: geometric defects and physical defects.

Geometric defects are created as a result of converting the digital solid geometry object representation to a surface geometry representation, such as an STL format file, and thence to a file with tool paths and deposition parameters specific to a selected 3D printer. Defects appear as gaps in deposited material when 3D printed. Likely gaps are observable in the output of the "slicer" software which slices an STL file into layers that a 3D printer successively deposits. Most slicer software relies on two strategies: 1) outlining edges with contours and 2) filling the XY planes between edges with raster patterns.

Further, current slicer software is usually optimized to reduce material usage while retaining or increasing strength, as opposed to fabricating airtight components or components that are optimized for use as insulating structures to limit convective losses. Additionally, imperfections in the material itself and the extrusion process yield gaps in the bonding between roads in the same layer and adjacent layers. These gaps form leakage paths through which fluids, gas or liquid, can escape.

Leakage paths in which fluids move between layers and in the same plane are "horizontal" leaks. Leaks in which fluids move through layers in a direction vertical with respect to the plane of the layers are "vertical" leaks. It will be appreciated that in practice, most leaks are a combination of these. The terms horizontal and vertical are relative to the plane of the 3D printer bed for purposes of this description.

Figure 4A:
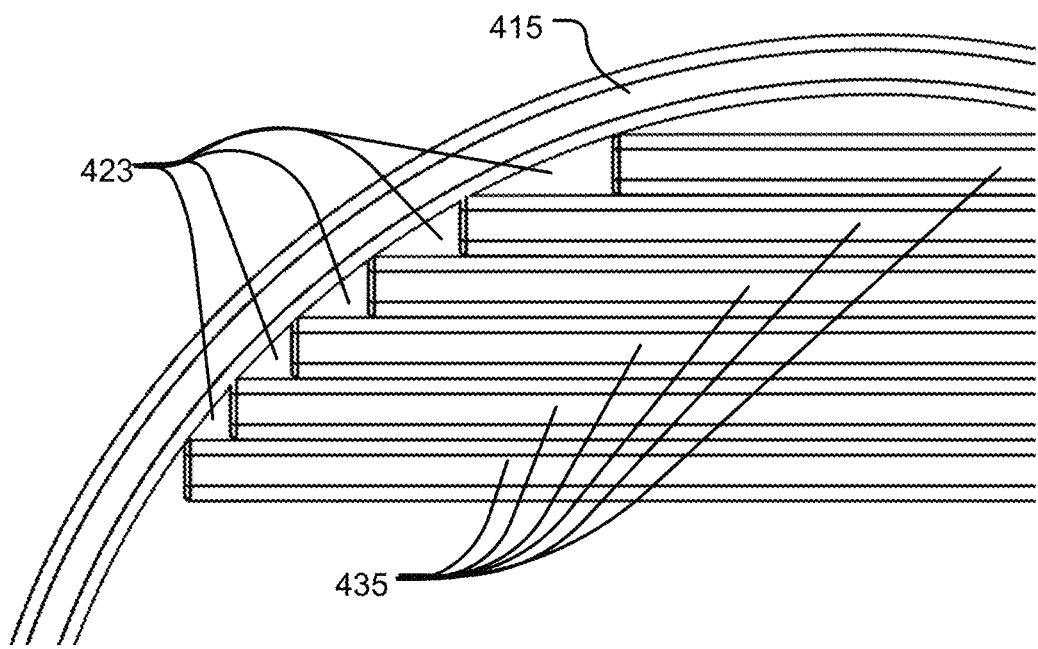
FIGS. 4A and 4B show a top view of some gaps 423 and 473 that result from the selection of a tool path to approximate a solid geometry.
Figure 4B:
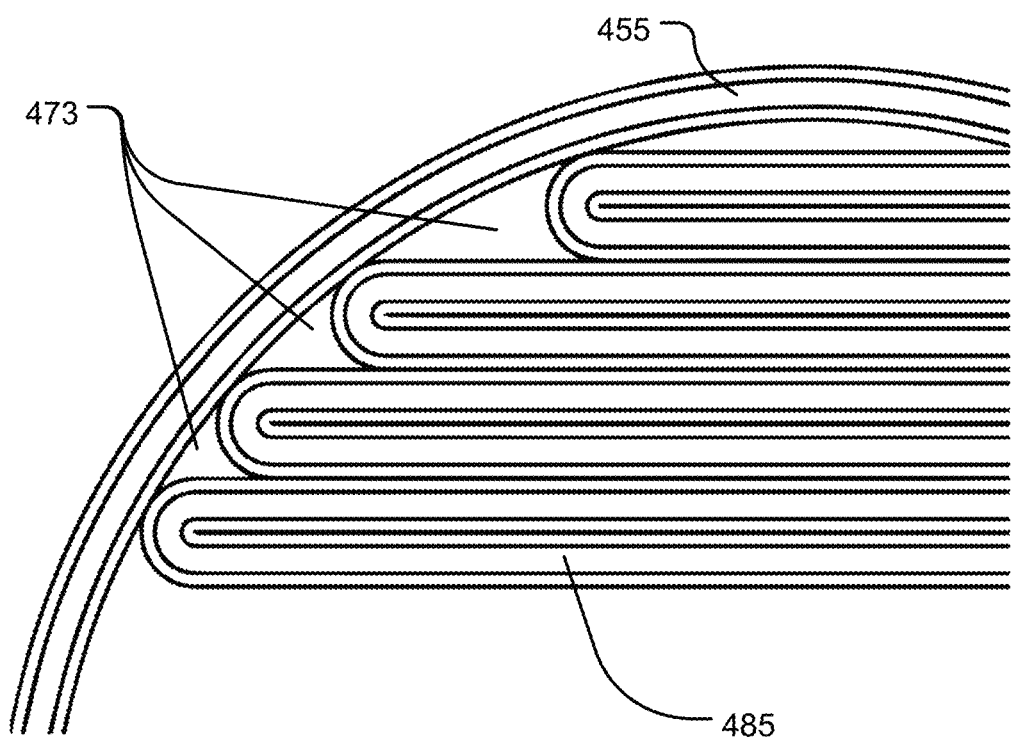

FIGS. 4A and 4B show a top view of gap defects where a raster fill abuts a surface or edge contour.

Figure 5:
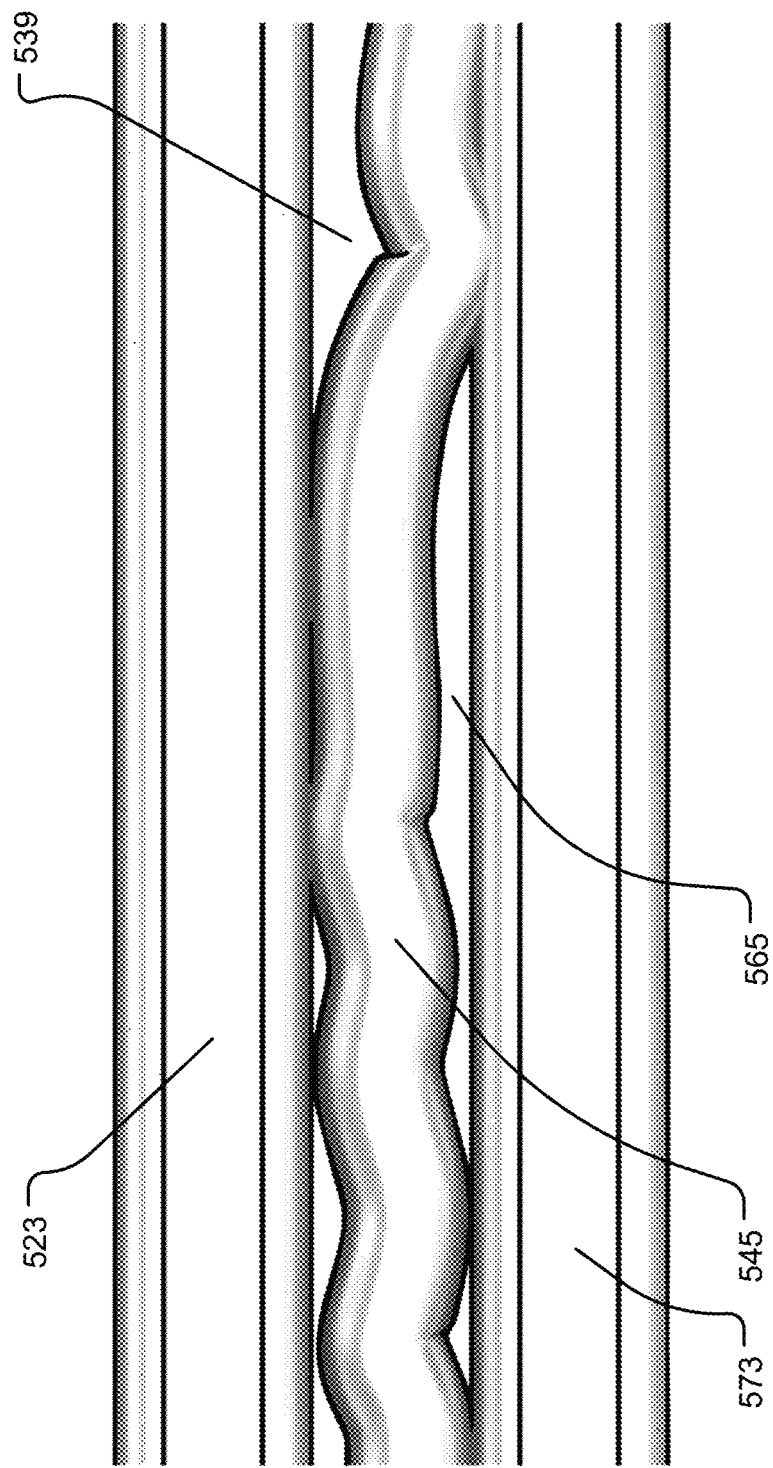
FIG. 5 shows a top view of a defect in which a defective strand of material having inconsistent width is extruded.

Physical defects, imperfections inherent in the physical material being used to fabricate the object and the 3D printer hardware itself, appear as gaps between the extruded material within a layer and between layers. FIG. 5 shows a top view of a frequent defect in which a strand of material having inconsistent width is extruded.

Figure 2:
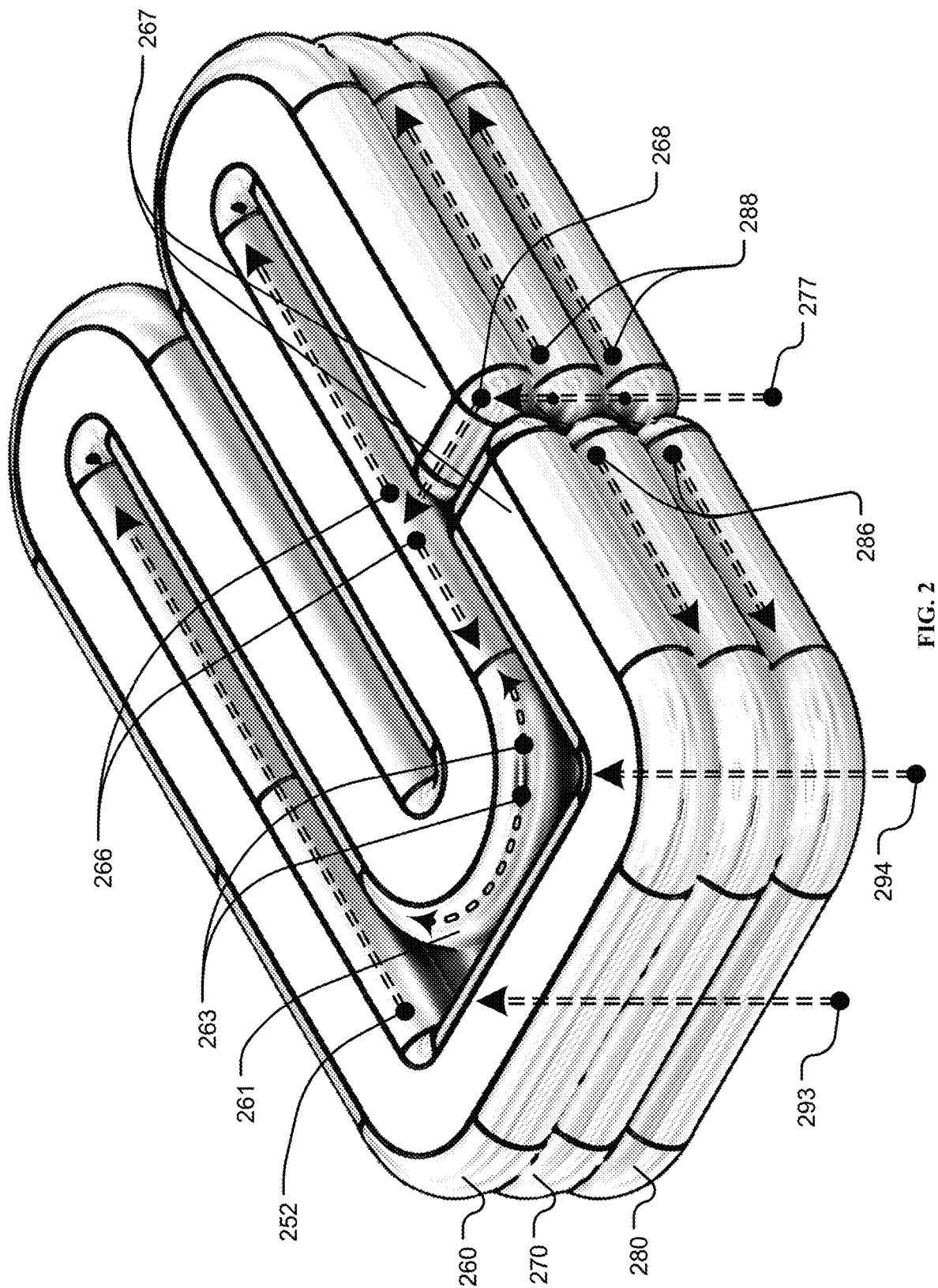
FIG. 2 illustrates some of the many routes a fluid can traverse through and across gaps or voids which are inherent in the 3D fused deposition modeling printing process. These gaps can form leakage paths through which a fluid, gas or liquid, may escape.

3D printed products using fused deposition modeling printers contain geometric and physical defects that can form leakage paths. Horizontal leaks are those in which a fluid traverses the XY plane which is parallel to the print bed. Vertical leaks are those in which a fluid moves parallel to the Z axis which is perpendicular to the print bed. FIG. 2 illustrates some of the many routes a fluid can traverse through and across gaps or voids which are inherent in the 3D fused deposition modeling printing process.

The technology disclosed solves the problem of eliminating or blocking leakage paths during the printing process itself, to allow fused deposition modeling printers to produce functional parts which include airtight and insulated walls. The solution includes combining structures that reduce or eliminate horizontal surfaces with continuous structures as modified finger joints that penetrate through multiple layers, optimizing tool paths to offset joints, selective overfilling and additional extrusions. Additionally, self-supporting essentially closed cell structures can be incorporated to form an insulated structure to moderate thermal properties by controlling convective losses.

Figure 6A:
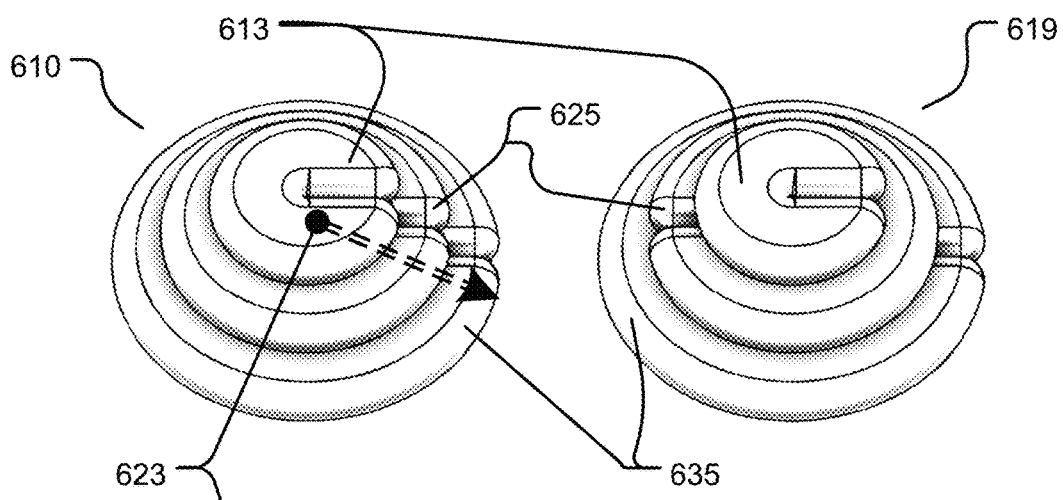
FIGS. 6A, 6B and 6C show how a horizontal leak can form along a seam resulting from aligned end joints of concentric contours. The offsetting of the joints to mitigate these possible leakage paths is also shown.
Figure 6B:
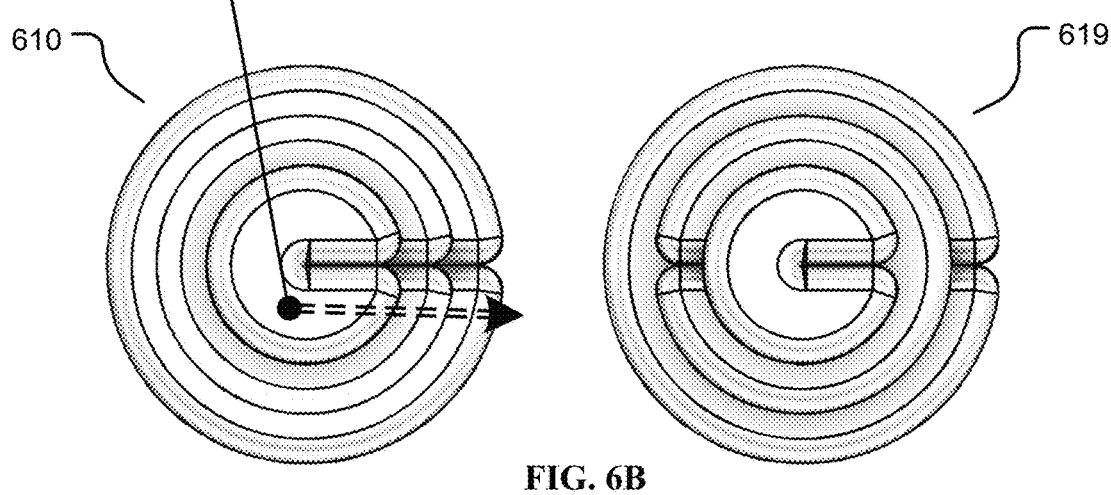

Reducing and eliminating horizontal surfaces with raster fill patterns mitigates leakage that can occur when adjacent filaments on the same layer do not bond as a new extrusion is placed alongside an existing filament. Voids and gaps as shown in FIG. 5 are also frequent. When a horizontal surface is redesigned as a series of sloping contours as shown in FIG. 1D, defects such as those exemplified in FIGS. 6A and 6B are eliminated.

Optimized tool paths minimize discontinuities by modifying the tool path to create a continuous tool path to eliminate tool path segments whose ends meet but are otherwise remain separated. An example is shown in FIG. 3 in which discontinuous tool paths 335 are connected to form a continuous tool path 365.

Figure 6C:
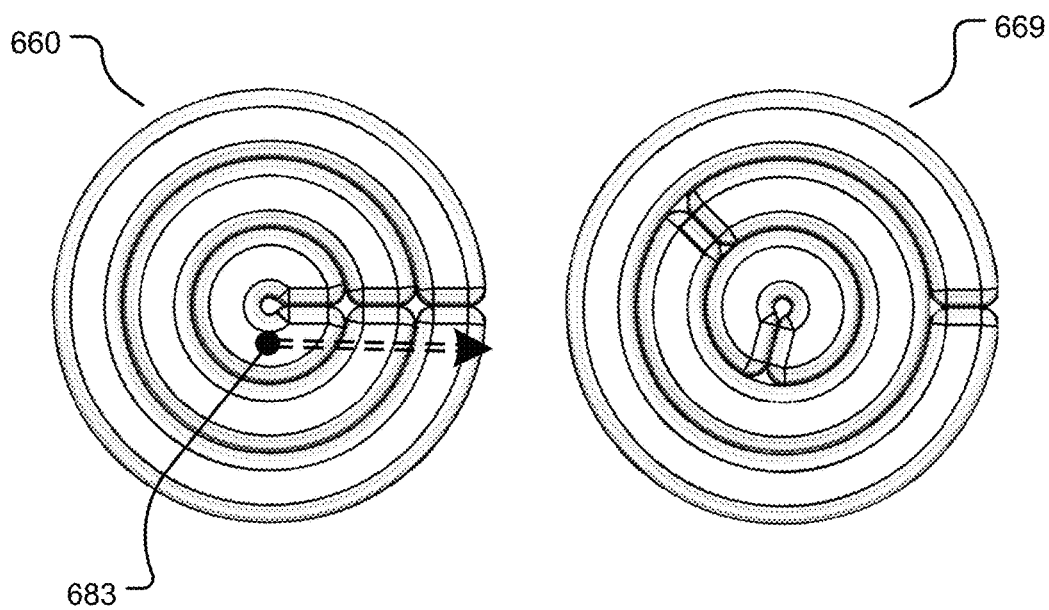
Figure 7A:
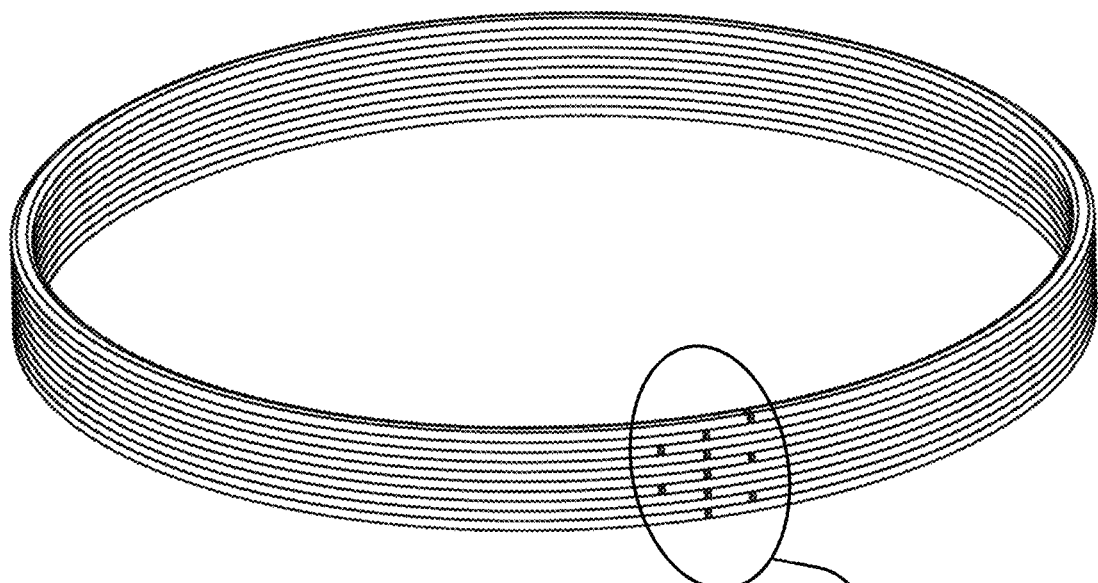
FIGS. 7A and 7B illustrate the radial offsetting of end-butt joints on layered contours to mitigate a possible vertical leak which could form a seam if the butt joints were aligned.
Figure 7B:
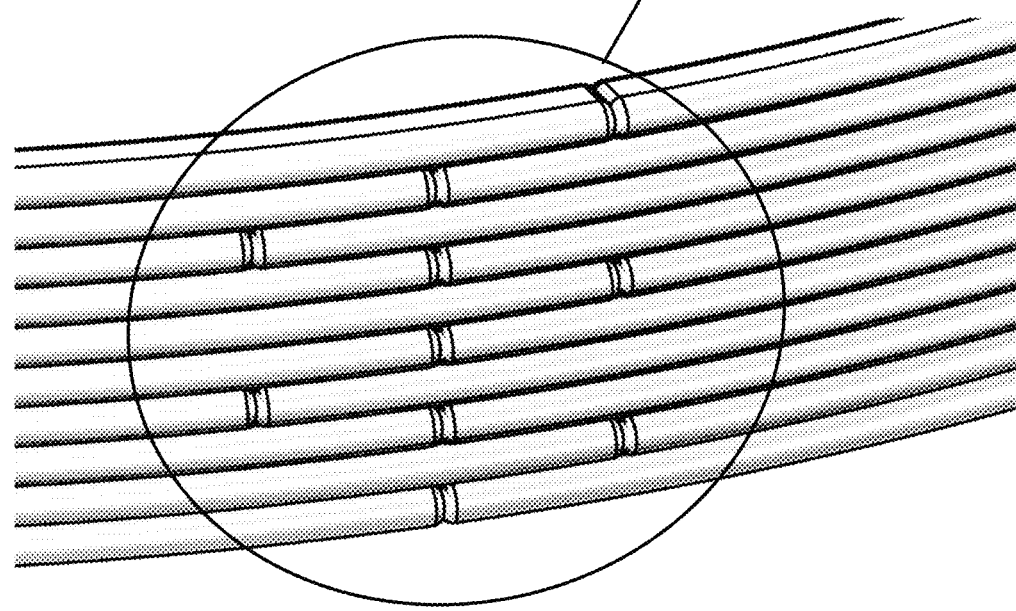

Some gaps can be predicted by analyzing the tool path itself. An example is a tool path in which end-butt joints between adjacent ends are aligned. This alignment can create leakage routes. FIGS. 6A-6C show how a horizontal leak along a seam formed by aligned end joints of concentric tool paths can be mitigated by modifying the tool path to offset these joints. A similar approach to mitigate vertical leaks along seams is illustrated in FIGS. 7A and 7B. In this example, the butt joints for contours are radially offset to eliminate a seam that would have been formed if the joints were aligned. Additional drawings in FIGS. 16-18 illustrate more details of these leak paths that are inherent in 3D fused deposition modeling printers.

Figure 8A:
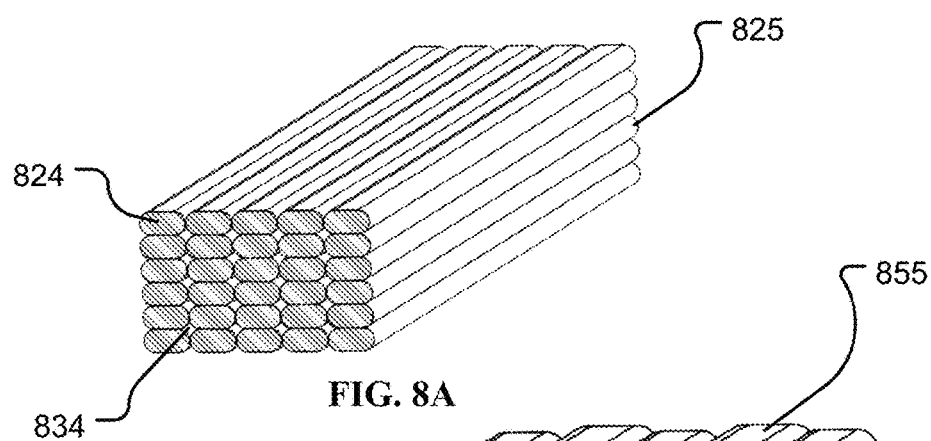
FIGS. 8A, 8B and 8C illustrate partial and full overfill to fill gaps that can occur between adjacent strands as they are extruded.
Figure 8B:
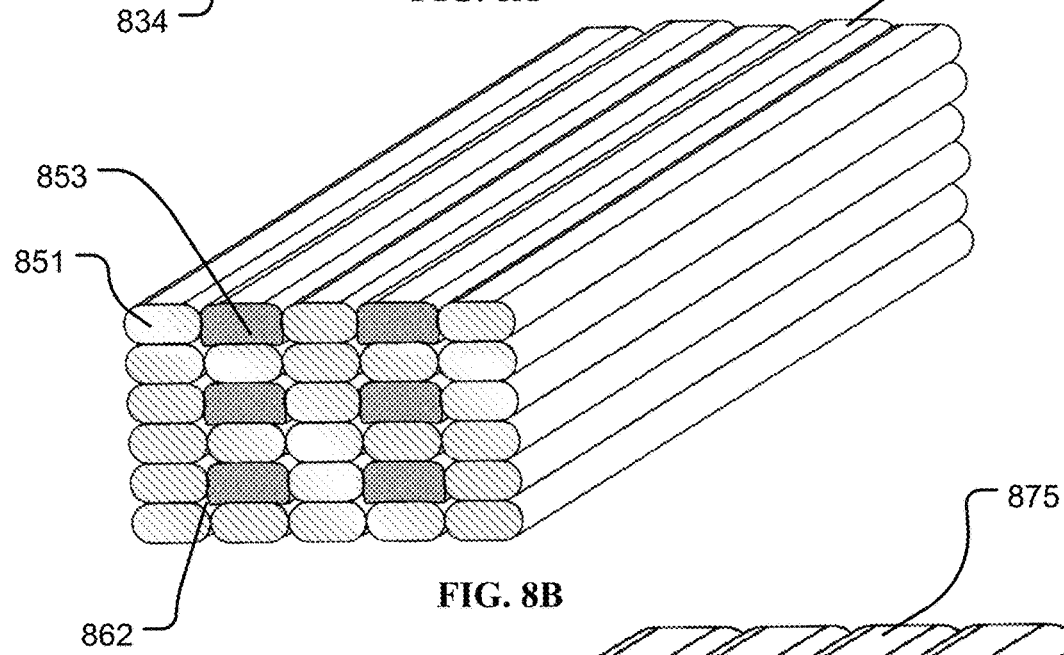
Figure 8C:
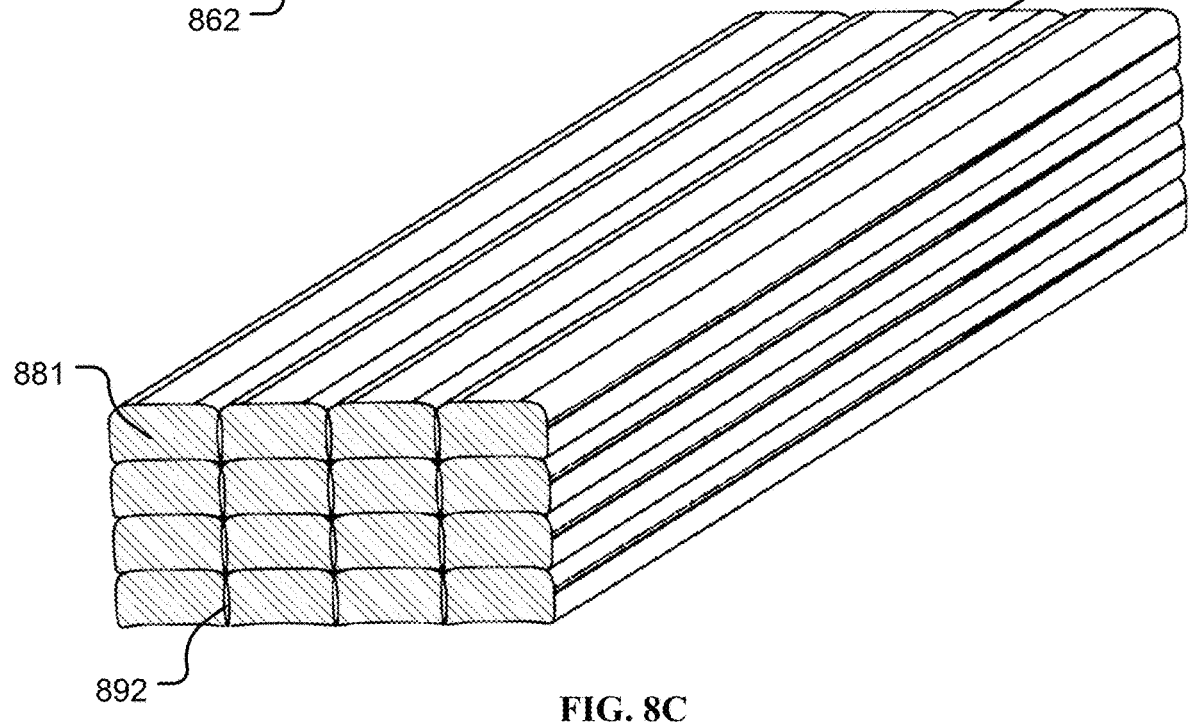
Figure 9A:
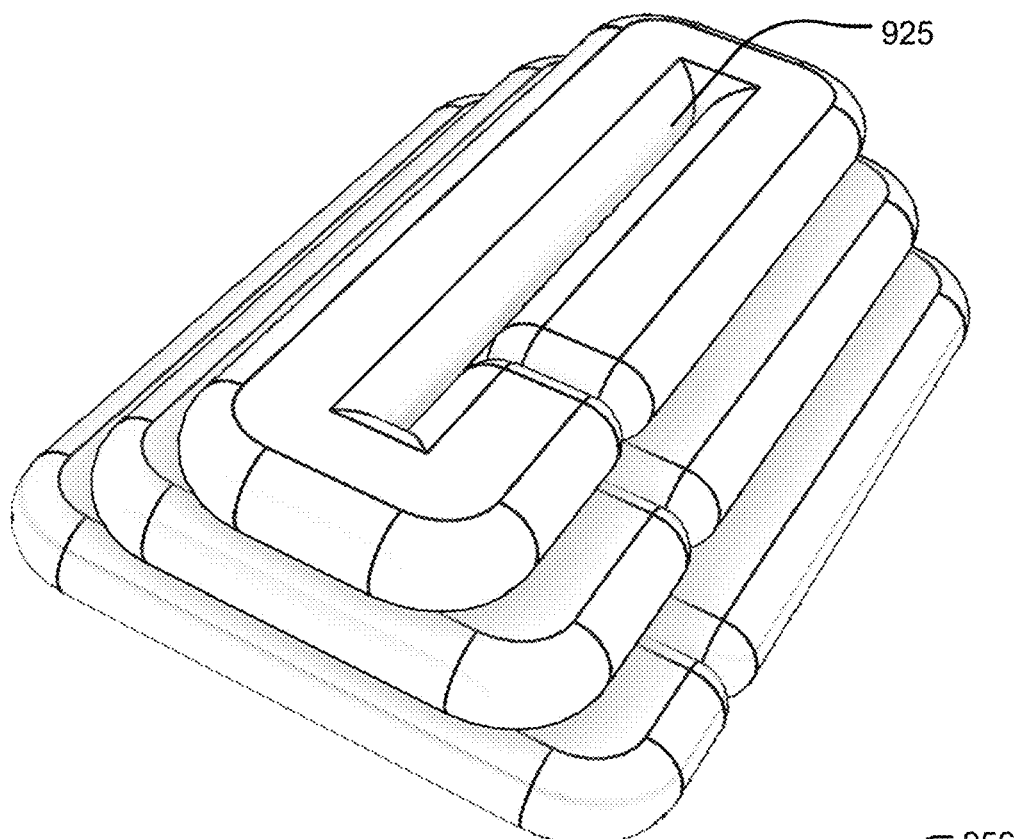
FIGS. 9A and 9B illustrate the use of additional extrusion to close a possible gap in the topmost layer of a part.
Figure 9B:
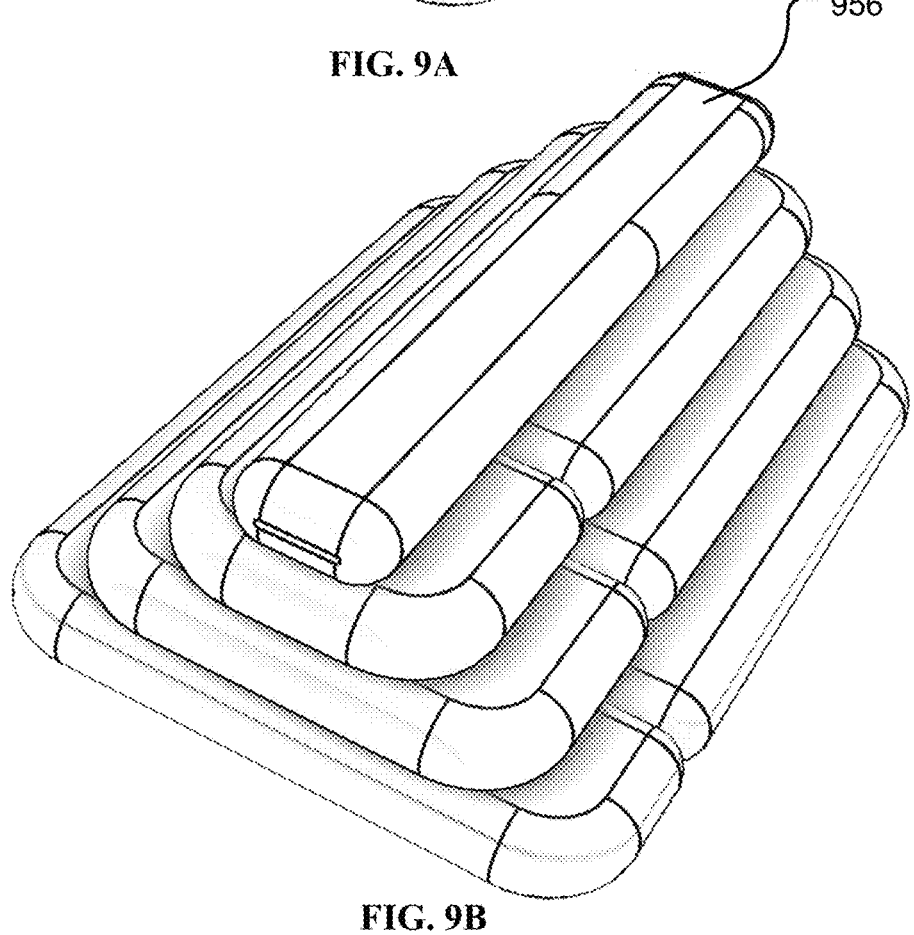

Selective overfilling and additional extrusion are also useable to fill gaps. FIGS. 8A-8C illustrate partial and full overfill to fill gaps that can occur between adjacent strands as they are extruded. FIGS. 9A-9B illustrate the use of additional extrusion to close a possible gap in the closing strands or contour of a part. In this case a continuous contour doubles back adjacent to itself to form two side-by-side strands comprising a ridge 925 which closes the cavity beneath it. To reduce or eliminate the possibility of a leak caused by defective bonding between these two strands, an additional extrusion 956 is placed over the ridge 925 and is aligned to cover the joint between strands forming the ridge. Note that this does alter the dimensions of a part; however, the purpose of the technology disclosed is to remediate gaps that cause leaks in order to produce airtight parts, in contrast to optimizing for dimensional accuracy.

Figure 10A:
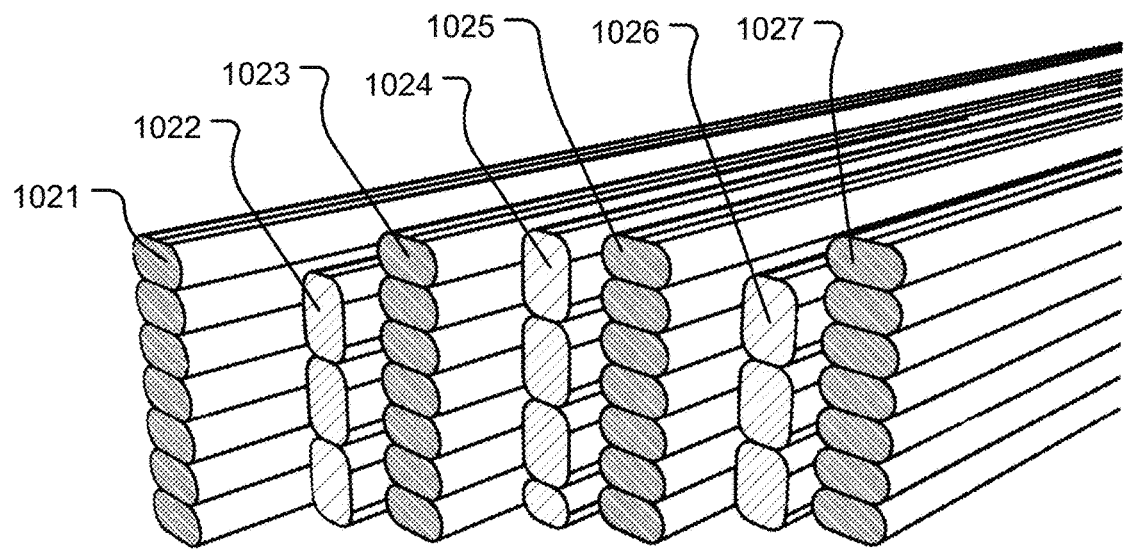
FIGS. 10A and 10B show an example of using thicker extrusions deposited into a "trench" that penetrates multiple layers as "fingers" to span alternating stacks of strands. This "modified finger joint" structure can block horizontal leaks that may occur between layers.
Figure 10B:
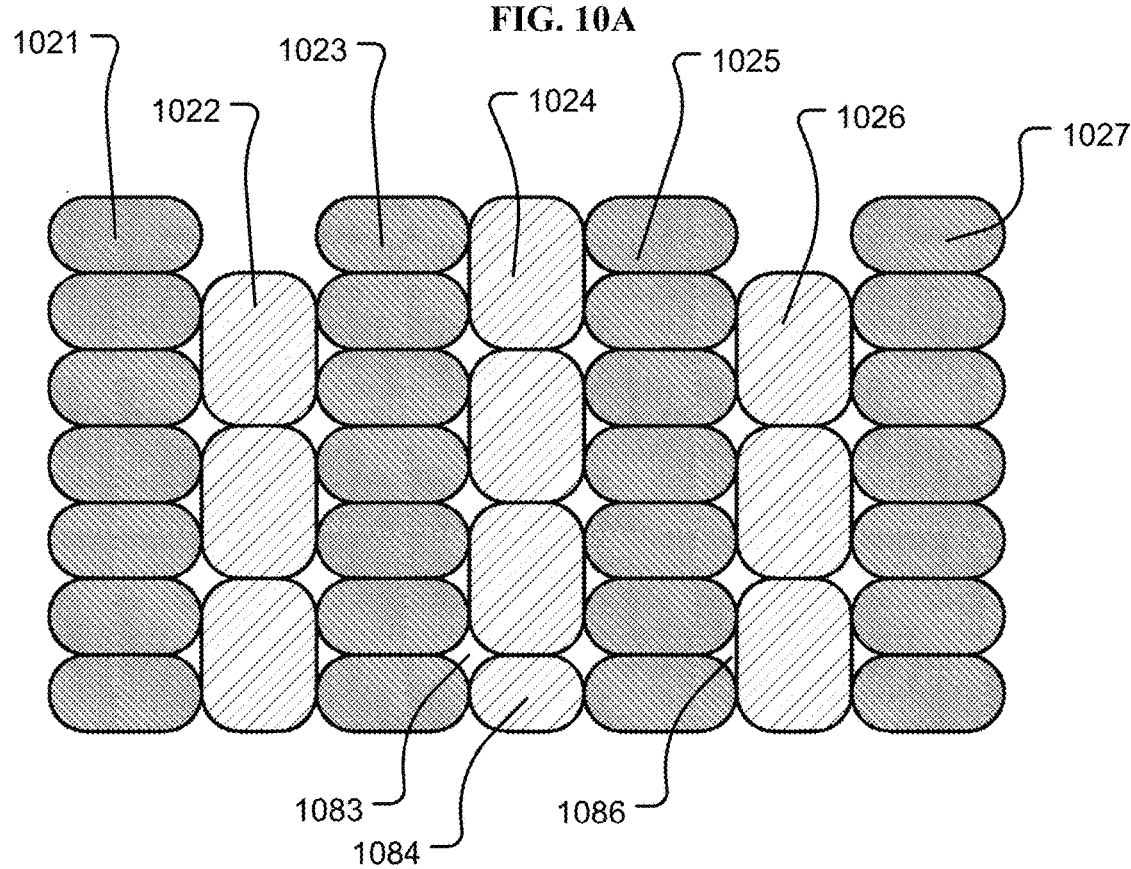

Sometimes horizontal leaks form along a plane between two layers when those layers fail to bond well, resulting in leakage paths along which a horizontal migration of fluid can occur. Modified finger joints resembling "interstitial fingers" can block horizontal leaks like these by forming continuous structures that penetrate through multiple layers to build a barrier that spans the seams between layers. FIGS. 10A and 10B show an example of this using thicker extrusions as interstitial fingers to span alternating stacks of strands.

Figure 11:
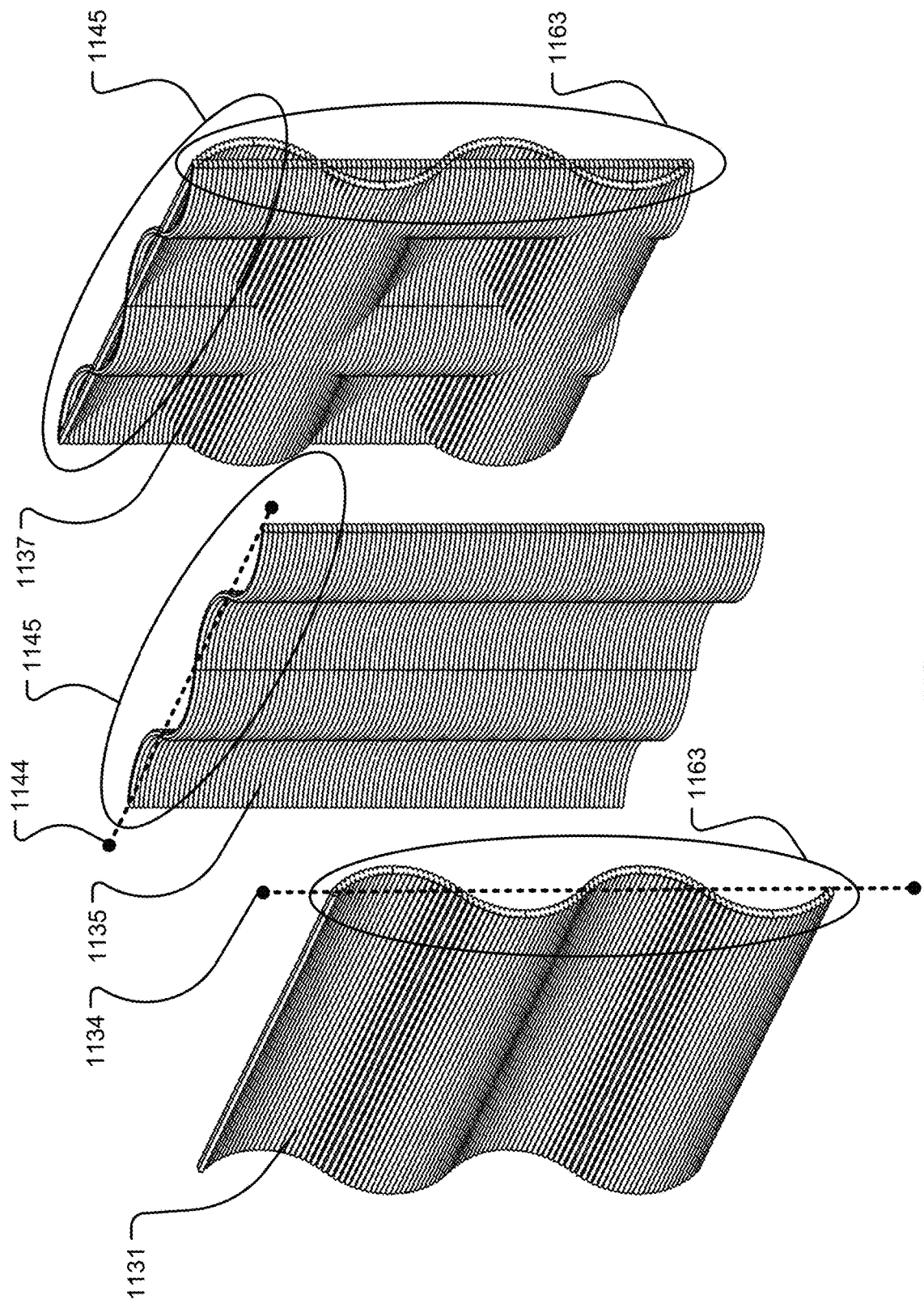
FIG. 11 and FIG. 12 show how two orthogonally oriented periodic shapes can be combined to form a self-supporting structure containing essentially closed cells.
Figure 12:
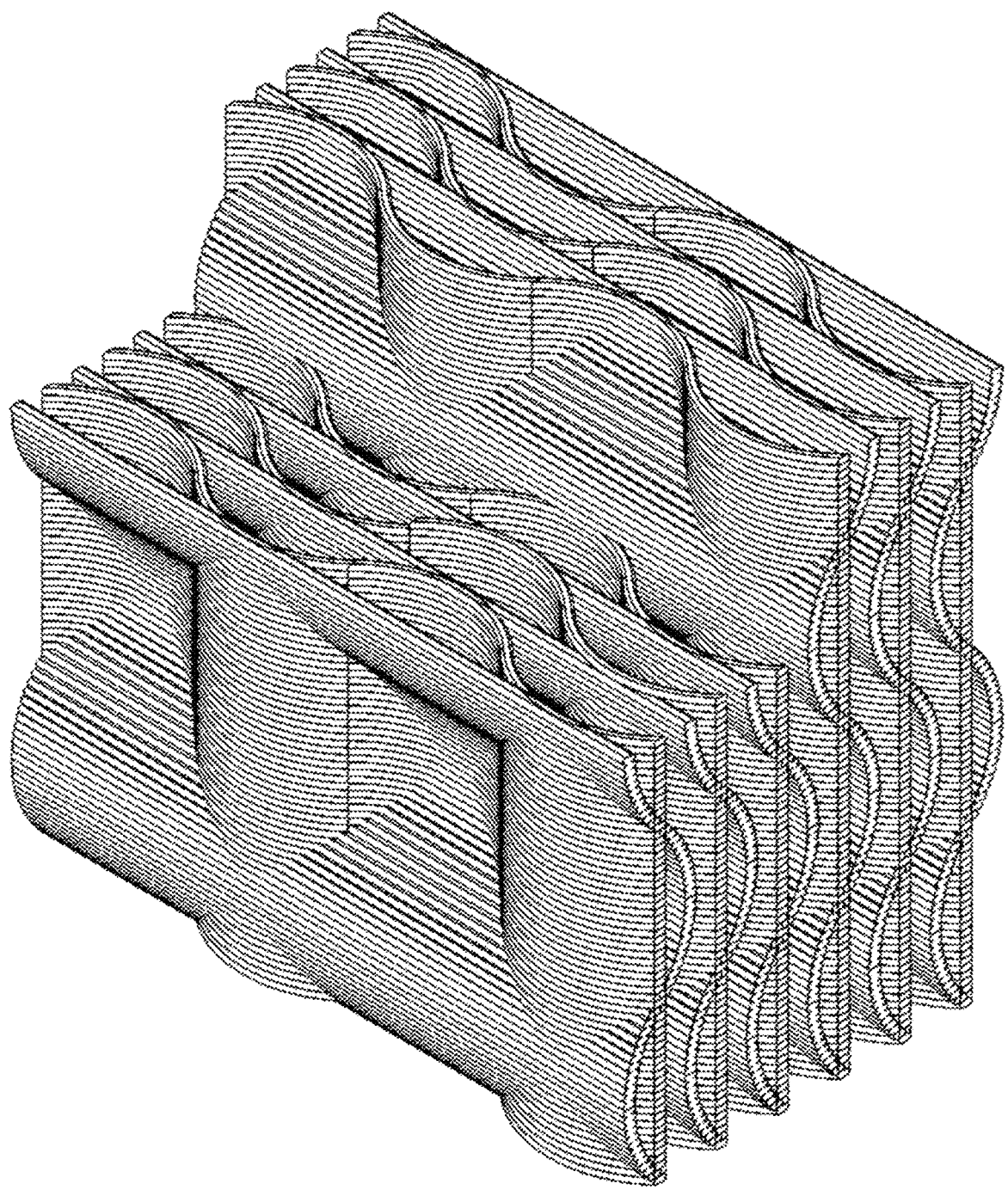

Self-supporting cell structures can be designed using contours that overhang successively layer-by-layer at angles up to 45 degrees from vertical and more in some cases, depending on the viscosity of the material being deposited. The contours can be continuous or designed to meet other contours to form essentially closed cell structures. The volume and shape of such cells can be modified to provide varying degrees of insulation. FIG. 11 shows how two orthogonally oriented periodic shapes can be combined to form a self-supporting structure containing closed cells. FIG. 12 shows how these structures can be layered to increase their collective insulating capability. FIG. 13 shows another arrangement of self supporting essentially closed cell structures that can be used to form insulating volumes in a part. FIG. 14 shows hexagonal and square self-supporting structures that form vertical columns. However these lack the insulating qualities of a closed cell structure as they permit convection through the vertical columns. One of the capabilities of 3D fused deposition modeling printers is their ability to fabricate objects that contain closed cavities that facilitate the construction of essentially closed cells.

Figure 1B:
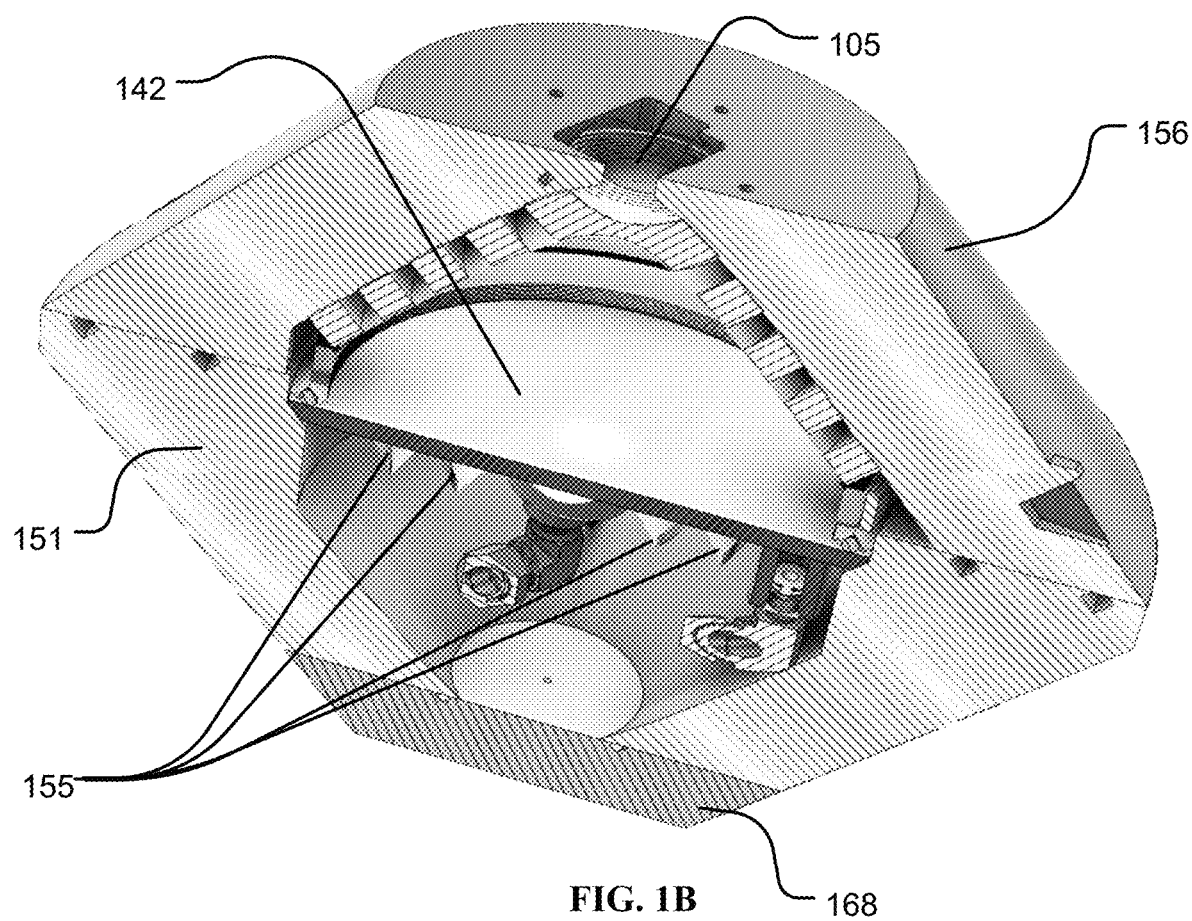
Figure 1C:
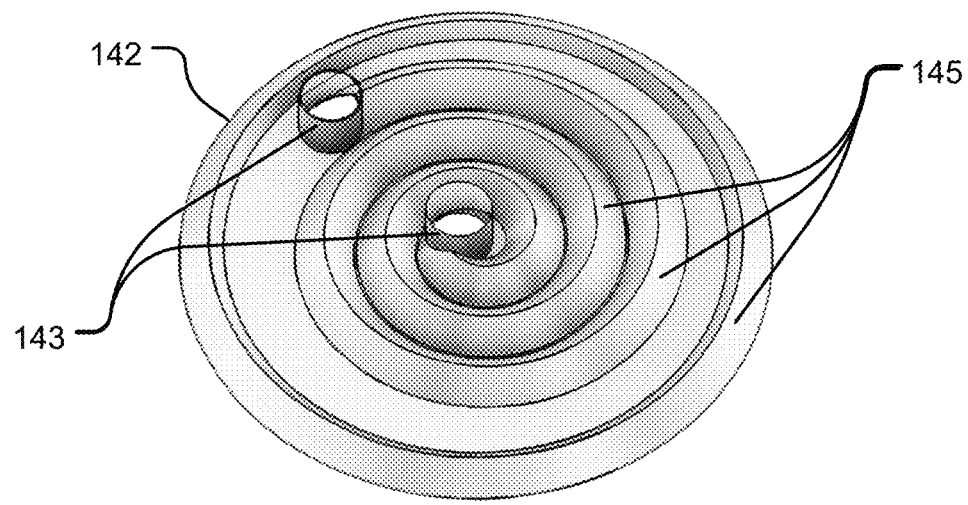
FIGS. 1C and 1D show how the circular base 142 of the environmental chamber 101 was printed to form an airtight cap in a roughly spiral shape having multiple triangular "V" shaped cross sections. It was built upon an underlying base layer and formed of overlapping contours fused to adjoining radially inward and/or outward contours.
Figure 1D:
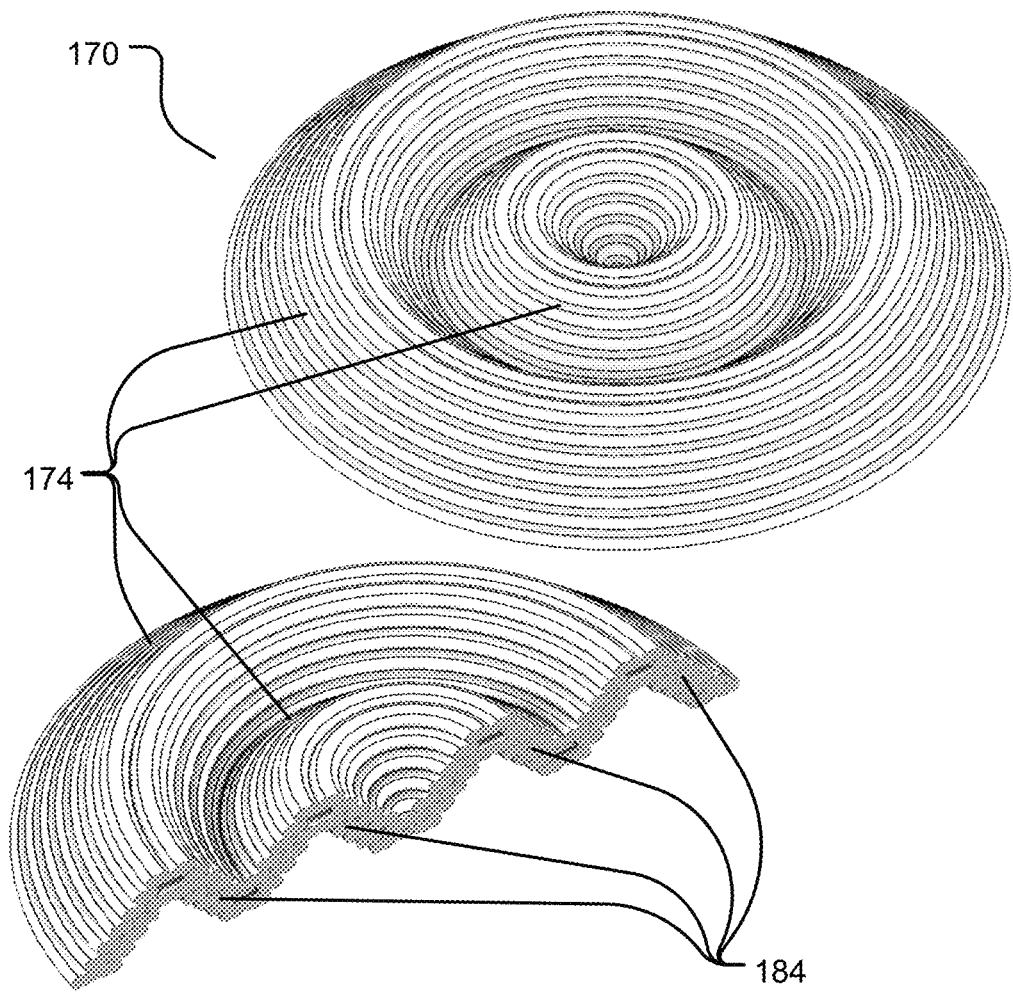

A practical application of the technology disclosed is shown in FIGS. 1A and 1B. This is an environmental chamber with integral heating and cooling circulator ducts. The chamber and the circulator ducts are 3D printed as one assembly and the floor is printed as a second assembly. Both make extensive use of the technology disclosed. The floor of the chamber is fitted with an O-ring seal where it attaches to the chamber. The hole at the top of the chamber is designed to accommodate a clear plastic window to allow light to enter the chamber and to allow visual observation. An outer insulating shell is placed around the chamber and floor to minimize thermal fluctuations by controlling convective losses.

FIGURES

FIG. 1A shows an example of a finished product made using the technology disclosed: an insulated airtight environmental chamber 101 with a circular window 105 in the top. Note that the chamber is in the form of a cone. The sloped sides 136 of the chamber are made entirely of contours and therefore do not exhibit the gaps that result from horizontal raster fill patterns that abut contours.

Also of note are the thermal circulation channels 125 that spiral around the outside of the chamber and share its outer surface as their inner walls. Ports or vent holes 112 and 121 provide for the circulation of cooling or heating fluid through the channels.

Figure 14A:
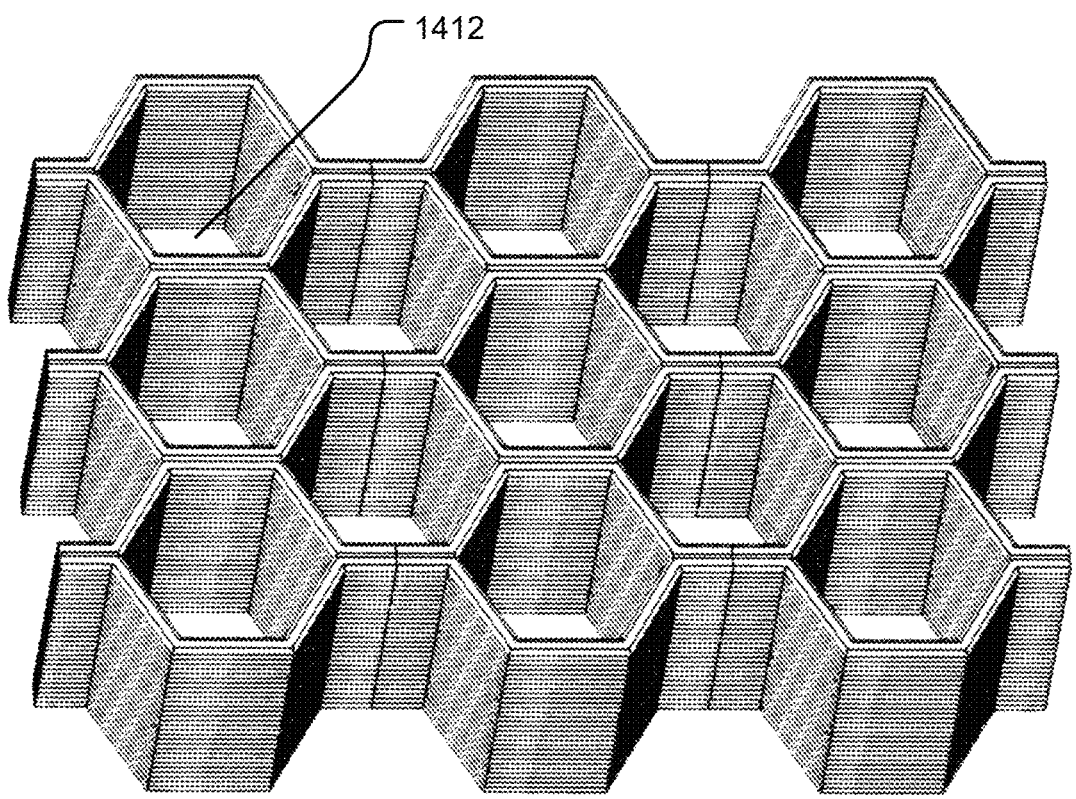
FIGS. 14A and 14B show hexagonal and square self-supporting structures that form vertical columns.

FIG. 1B shows an insulating shell over the chamber. The shell 151 and 156 is made with sloping walls that use contours. It is infilled with hexagonal infill as shown in FIG. 14A that is capped using bridging every twelve layers. The bridging was implemented as concentric contours deposited over vertical hexagonal columns at a given layer height. Bridging is possible for this pattern because the distance between walls is small enough the extruded filament is viscous enough to bridge the gap between the walls. Note that the sealing performance of bridging is prone to leaving gaps, however it provides some insulation improvement by restricting convective flow. The base 168 is also insulated using the same hexagonal infill.

FIG. 1C shows an airtight cap 142, also shown in FIG. 1B, with two vents or ports 143 that form a circular base 142 of the environmental chamber 101 that was printed to form a roughly spiral or helix shape that adjusts inward one-half contour width per revolution. This tool path forms a sloped wall at approximately 45 degrees. The contours of a layer are in direct contact and fused to their underlying layer. Further, an overlap of at least a 40 percent of the width of an overlaying contour is maintained with its corresponding contour on the immediately underlying layer to provide structural support.

The "V" shaped sloping surfaces 145, whose peaks appear as 155 in FIG. 1B, have a cross section similar to that shown in FIG. 1D resembling open triangles 184 to eliminate a flat horizontal surface. We describe this as "nested in a relief shape" because the "V" pattern in the cross section is repeated, i.e. "nested," as the cross section is viewed from the outer or distal edge to the proximal or inner center and because the surface is raised it is said to be "in relief", as opposed to flat. Further, we describe the "V" shaped embodiment shown here as a "triangulated cross section" or a "triangulated three dimensional surface."

In this example, several "V" shaped sloping surfaces are nested in a relief shape defined by the "V" shape 184, and fused together to span the distance between the outer or most distal contours to form a continuous surface that has no raster fill, thus eliminating the gaps inherent in raster fill patterns as illustrated in FIG. 3. The base contours for this example are arranged concentrically to form an underlying base layer of polymer.

Alternate embodiments can include nested profiles in relief other than the "V" shape shown, provided that the contours comprising such profiles overlap and meet and fully span the distance between the first contours deposited, which outline an overall profile.

We describe initially deposited contours used to form a base for the subsequent structure being printed as "base contours." These base contours are deposited over an underlying layer or substrate and provide support for subsequent overlaying cantilevered contours fused to them on successive layers. A stack of these cantilevered contour layers can span a distance to form an airtight surface or essentially closed cells within a larger structure. An overlap of 40 percent of the overlaying road width or more is used to minimize sagging or drooping of cantilevered contours.

Additionally, the spiral shape used in this case has the benefit of terminating internal end joints in a central opening used as a port or vent into the environmental chamber.

FIG. 1D shows an example of an airtight cap as a simple circular shape 170 having triangulated cross sections 184. The sloping sides 174 are printed from concentric contours that are fused to corresponding contours in an underlying layer. The contours in a given layer are coplanar and form coplanar layers. Additionally, concentric, coplanar contours fused together can be used to create a doublewide or wider base contour layer to fabricate a thicker wall that is stronger, stiffer and better sealed than a single contour.

By concentric, we mean than an inward contour is concentric to an outward contour when the outward contour encircles the inward contour. The adjoining contours are not only concentric, they in direct contact and are fused together. Circular, oval, square and polygonal contours with slightly rounded corners are easily visualized.

Successive layers of concentric, coplanar contours can be overlaid and "cantilevered" by offsetting them with respect to their underlying corresponding contours, providing an overlap of at least 40 percent of the width of the overlaying contour is maintained as shown in FIGS. 9A and 9B. In an alternate embodiment, 20 to 40 or 30 to 40 percent overlap may be used, however this can result in sagging and drooping strands that affect airtight performance and part dimensions.

The use of cantilevered layers of concentric, coplanar contours allows a part to span a horizontal distance without using any flat horizontal surfaces. The rationale is that most slicer software as of this writing produces "flat" horizontal surfaces using raster fill patterns to "fill" the spaces between contours that outline an edge of an object as shown in FIG. 3. Thus, the gaps inherent in these patterns can be eliminated by avoiding them by designing and building objects and parts that use contours.

A slicer server containing a processor and memory runs slicer software that accepts input in the form of an STL file or equivalent description of surface geometry of a part or object in the form of a triangulated mesh that can be sliced into layers to print the part. This input provides the dimensions of the part and cross-sections of the part, which describe the number of concentric base contours to produce the part. Additional input specifies thickness parameters for layers to be printed. Together, this information allows a slicer server to calculate the number of cantilevered contour layers required to span one or more distances to produce a three dimensional surface that covers the underlying base contours, and automatically generate corresponding tool paths.

FIG. 2 illustrates some of the many routes a fluid can traverse through and across gaps or voids which are inherent in the 3D fused deposition modeling printing process. These gaps form leakage paths through which a fluid, gas or liquid, can escape.

Three contours 260, 270 and 280 form a stack with aligned end joints 267. These form several leakage paths indicated by 266, 268, 277, 286 and 288. Internal leak paths are indicated by 293 and 294. These migrate to form additional leak paths 263 around a "U" shaped surface 261.

FIG. 3 is an example of joining a discontinuous tool path as shown by the raster pattern 335 into a continuous tool path indicated by the zig-zag raster fill pattern 365. Gaps are indicated by 331 and 374 where the contour 314 meets rasters 335 and 365.

FIGS. 4A and 4B show a top view of gaps that result from the selection of a tool path to approximate a solid geometry. In FIG. 4A, a straight raster pattern 435 meets a contour 415. In FIG. 4B a zig-zag raster fill pattern 485 meets a contour 455. In these cases gaps 423 and 473 result from the tool path traversed by the extrusion head of the 3D printer.

Figure 4C:
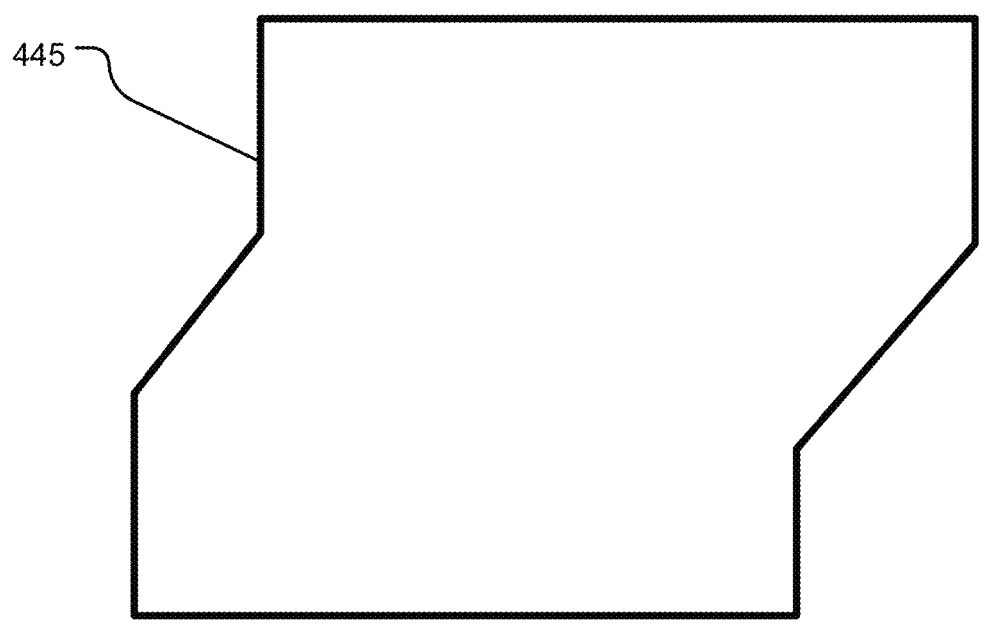
FIGS. 4C and 4D illustrate an effect called "staircasing" and its attendant gaps that result from the slicing operation used to create a stack of layers comprising a shape.
Figure 4D:
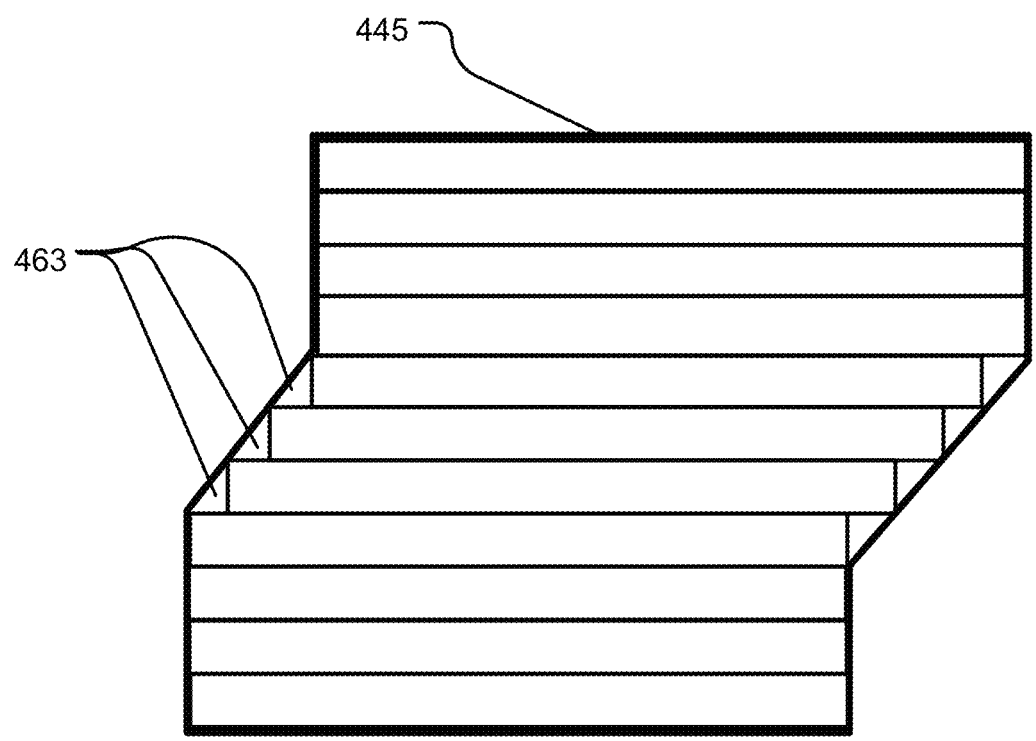

FIGS. 4C and 4D illustrate an effect called "staircasing" and its attendant gaps that result from the slicing operation used to create a stack of layers comprising a shape. When an STL file, a triangular mesh that represents a surface geometry, is then input to a slicer server that runs slicer software, the resulting slices are stacked to represent an object or part. Since a slice is a layer of polymer that has a finite thickness it only approximates shapes except for cases in which the edge of a shape aligns with the Z-axis, which is vertical to the print bed. FIG. 4D shows the gaps 463 that result when shape 445 in FIG. C is sliced. The effect illustrated by the gaps 463 is called "staircasing" because of its resemblance to a flight of stairs. This is similar to the gaps 423 and 473 in FIGS. 4A and 4B that result from using raster fill patterns to approximate the space between contours.

FIG. 5 shows a top view of a frequent defect in which a strand of material having inconsistent width 545 is deposited between two adjacent strands 523 and 573 on the same layer. Gaps 539 and 565 appear on both sides of the defective strand 545. These gaps, also called voids, can create a leakage route between adjacent top and bottom layers. They can be caused by inconsistent filament widths that result in extruding less material than expected and therefore generate a gap between neighboring roads.

Many different kinds of filament materials are available. Most of them are based on thermopolymers. ABS (acrylonitrile butadiene styrene) is one of the most popular and readily available. PEI (polyetherimide) has superior mechanical and thermal properties relative to ABS. PLA (polylactic acid) is biodegradable. PC (polycarbonate) is extremely tough and impact resistant. There are several others, each with its own properties. Many of these thermopolymers can be combined with other materials including metal, ceramic, wood, chalk and carbon to provide different textures and performance characteristics.

Filament is available in diameters ranging from 1.75 mm to 3.00 mm. The filament is fed into a 3D printer and heated in the printer's extrusion head to a temperature at which it softens and then melts into a viscous material that is extruded through an extruder nozzle ranging in diameter from as small as 0.005 inch at the time of this writing.

During the extrusion process, voids can be formed when hot material is extruded adjacent to a much cooler surface or a surface that dissipates heat much faster, in which case the adjacent roads may fail to bond completely. The resulting bond may then be defective or lacking altogether if adjacent filaments that are intended to be bonded do not touch. As an example, this could result from the time it takes a tool to traverse a simple raster tool path to one end of a road and return to the other end to deposit the next road adjacent to it. In addition, the raw filament being fed into the 3d printer may vary in diameter or the extrusion motors may experience speed fluctuations. In either case, the result is a variation in the amount of material deposited, causing inconsistencies in the road width which may lead to voids. Further, some types of filament shrink more than others while cooling and have an effect similar to extruding too little material. These are just a few of the possible bonding problems that can cause gaps or voids between adjacent roads.

Many variables can influence bonding, including: temperatures of the extrusion head and print table, temperature differentials between the filament being extruded and adjacent filaments, non-uniform material flow, variations in filament diameter and feed mechanism problems that damage the filament during the print process. Bonding defects are frequent in fused deposition modeling and often result in gaps through which leaks can travel. FIG. 5 shows an example of this.

FIGS. 6A-6C show how a combination or horizontal leak shown as 824 and 683 in the stack of layered contours 610 and the coplanar contours 660 can form along a seam resulting from aligned end joints of concentric contours. The radial distribution to offset the joints to mitigate these possible leakage paths is shown in 619 and 669. FIGS. 6A and 6B also illustrate how concentric overlying contours, circular in this example, can be cantilevered to form a closed conical shape. A plug can be deposited at the top center of the cone to form an airtight seal.

Figure 6D:
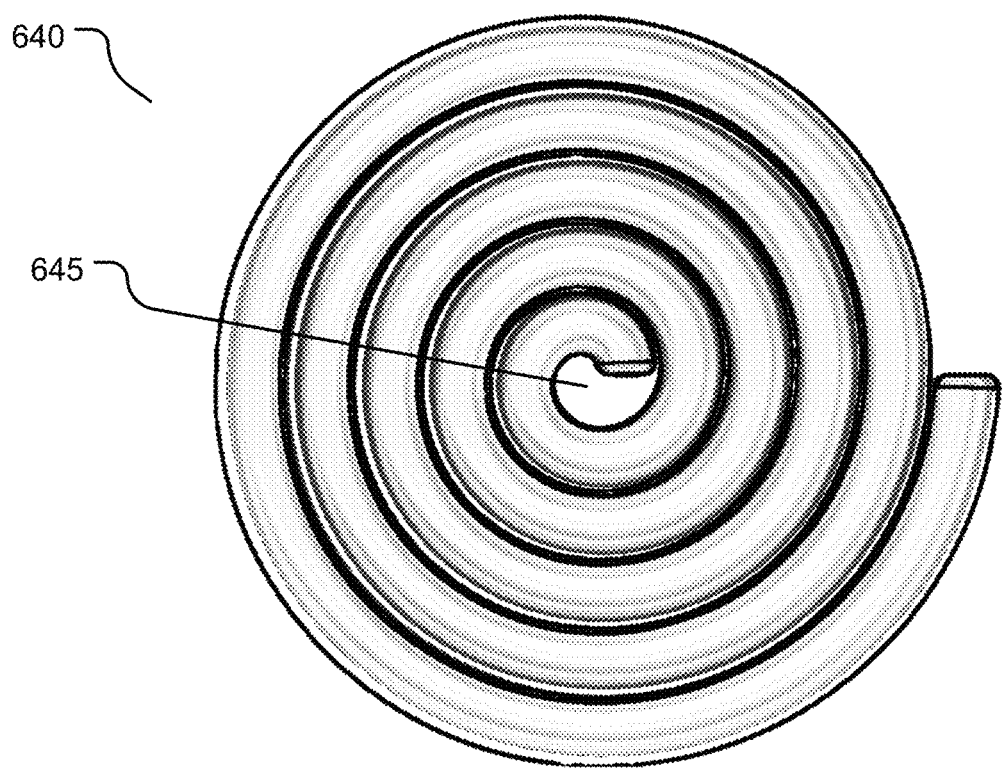
FIG. 6D shows a top view of a spiral contour that can form a flat surface and eliminates gaps that occur with raster fill patterns.

FIG. 6D shows a top view of a spiral contour 640 that can form a flat surface with a continuous tool path to eliminate the gaps that occur with raster fill patterns when they abut contours. It also optimizes the tool path by eliminating end-butt joints on concentric contours as in FIGS. 6A-6C. The center opening 645 can be overfilled or filled with an additional extrusion to provide a better seal.

Figure 6E:
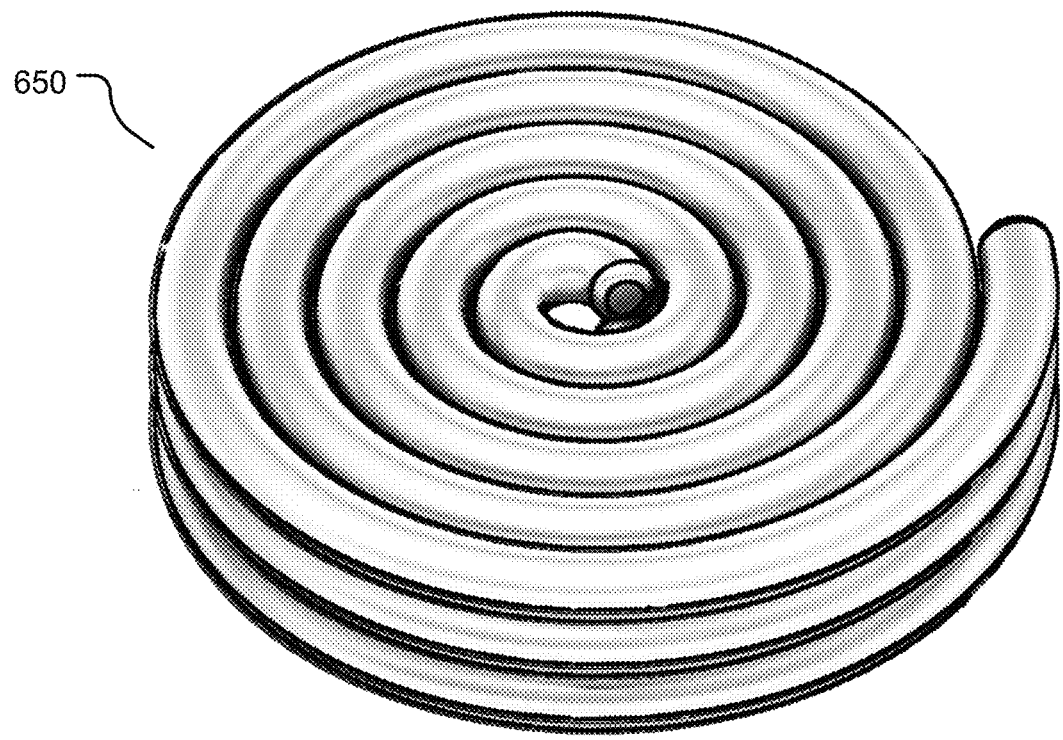
FIG. 6E shows a perspective view of a stack of three contoured layers as in FIG. 6D. The use of multiple layers provides redundant leak protection.

Note that the examples in FIGS. 6D and 6E are based on a circular spiral. However the use of spirals may be extended to other shapes. By spiral we mean a continuous path from distal to proximal, or reverse. Circular, oval, square and polygonal spirals are easily visualized and can be extended to a general case of starting with a contour outlining an arbitrary shape on an XY plane. A tool path can start at a distal point on the inside of an outer contour perimeter of the outlining contour and follow this perimeter. Upon completing a complete circuit it fuses to the proximal surface of the preceding circuit and continues to do so until the area enclosed by the shape is filled with the continuous contour so generated. The final remaining are, mostly proximal, can then be fill with a plug by overfilling or by adding additional material at the proximal end of the tool path. The tool path can be tapered at the beginning of the first circuit to provide a gradual transition to the remaining circuits. The transition is provided by tapering the polymer deposited in the radially outermost ring of the continuous contour.

Additionally, a spiral can be envisioned in three dimensions using cantilevered contours. An example of a cantilevered spiral is a cone in which successive contour layers are circular, concentric and overlap their immediately underlying contour layer by at least 40 percent of the overlaying contour's width.

FIG. 6E shows a perspective view 650 of a stack of three contoured layers as in FIG. 6D that are fused in contact and directly overlaid with at least a 90 percent overlap of the contour width of the overlying layer. The use of multiple overlaid layers provides redundant leak protection.

Alternatively, subsequent spiral contours deposited over underlying contours can be centered between the roads of the underlying contours to cover the seams between the underlying coplanar contours.

FIGS. 7A and 7B illustrate the radial distribution or offsetting of end-butt joints 736 on layered contours to mitigate a possible vertical leak that could form a seam if the joints were aligned as in 277 of FIG. 2. By radial distribution of joints we mean that the joints are offset so as to lie on different lines or rays that diverge from a central point.

FIGS. 8A-8C illustrate perspective views of partial and full overfill to fill gaps that can occur between adjacent strands as they are extruded. Overfilling can allow molten filament material to flow into gaps like those in FIGS. 4, 5, 16, 17 and 18 created when a solid geometry is converted into a tool path. This can help to mitigate some leaks.

However, overfilling by itself is not a solution and it does require one skilled in the art to use it judiciously. Proper overfilling requires the extrusion nozzle to exert pressure on the material being extruded to force it into the gap being filled. Without this pressure the material may not fill gaps completely and voids may occur. Note also that if overdone, overfilling can force material to flow or overflow into places that not only create a sloppy surface but can also create leakage paths.

A stack of roads 825 in FIG. 8A. with no overfilling is shown with one of several similar gaps 834 that can traverse the horizontal seam along parallel strands. 824 shows one of several shaded faces, none of which correspond to overfill roads. FIG. 8B shows a stack of roads 855 in which partial overfill forces material into these interstices between strands 862 to help mitigate leaks. The darker shaded faces 853 are overfilled and the lighter ones 851 are not. FIG. 8c shows a stack 875 of overfilled roads with all faces 881 indicating overfilling and 892 showing how the overfill material fills the interstices along the horizontal seams.

FIGS. 9A-9B illustrate the use of additional extrusion 956 to close a possible gap where two roads meet to form a ridge or point. They also show how layers can be offset so that roads in one layer overlap the roads in an underlying layer to cover horizontal joints between the sides of two roads in the underlying layer.

FIGS. 10A and 10B show an example of using thicker extrusions 1022, 1024 and 1026 deposited into a "trench" that penetrates multiple layers 1021, 1023, 1025 and 1027 as "fingers" to span alternating stacks of strands. This "modified finger joint" structure can block horizontal leaks that may occur between layers.

The underlying design is to leave a gap between two or more strands for two or more layers to form a "trench" that can be filled as shown in FIG. 10A, thereby creating a continuous wall that runs the length of the gap and overlaps the horizontal seams that run lengthwise along the strands adjacent to the wall.

In an alternate embodiment, a similar result can be achieved by depositing a thicker road that rises above an existing layer and then depositing successive layers around it. In yet another embodiment, a trench may be partially filled initially as in 1134 and subsequently, as additional layers are built around it, filled with extrusions that overlap adjacent roads on the underlying layers.

As shown in FIG. 10B, these continuous walls can be offset to avoid the upper surfaces of the strands across a given layer. Each of these walls acts as a sort of "modified finger joint" that penetrates and connects multiple layers while providing an additional barrier to leaks that may traverse the XY plane of a layer.

Note that the overlapped interstices 1086 reduce the cross section of the interstitial gap by approximately half as compared to 1083, which is not overlapped.

FIG. 11 shows how two orthogonally oriented periodic shapes can be combined or mated to form a self-supporting-cantilevered contour structure containing essentially closed cells. Contours are used to avoid reliance on raster fills, in this FIG. 11 and FIGS. 12 and 13 as well. The shapes in this example are sinusoidal and intersect to form essentially closed cells. Other periodic or repeating mated patterns that do not exceed a side slope angle of roughly 45 degrees from vertical, preferable for maintaining a self-supporting cantilevered contour structure via an overlap between overlaid contours of at least 40 percent of the overlaying contour's width, could also be used and would be apparent to one skilled in the art. Note that since these shapes move up and sideways with successive layers, the tool path used is a contour to avoid creating a horizontal surface.

The cross sections of these shapes can be approximated by a spline that traverses through the minimum and maximum pattern extents of the periodic shapes. Since a spline does not have sharp corners and therefore can be differentiated over its full length, the curvature of the cross sections can be indicated by the second derivative of the function specifying the spline. The pattern extents are with respect to the central axis or axis of variation of the periodic shape. In the example given in FIGS. 11, 1134 and 1144 are the axes of variation for surfaces 1131 and 1135, respectively. The cross sections of the surfaces are indicated by 1163 and 1145 and are show combined in the structure 1137.

Note that the sign of the second derivative of the splines which approximate cross sections 1163 and 1145 will vary from positive to negative repeatedly over the length of the splines.

These shapes can be made with multiple contours for additional strength or to add redundant leak mitigation. Further, since this structure is self supporting the essentially closed cells that result require no additional support as they are printed. This is achieved by maintaining at least a 40 percent overlap between a contour and its corresponding underlying road or contour, where the 40 percent is with respect to the overlaying contour's width.

FIG. 12 shows how several instances of the self-supporting structure shown in FIG. 11 can be layered to provide increased insulating capability.

Figure 13A:
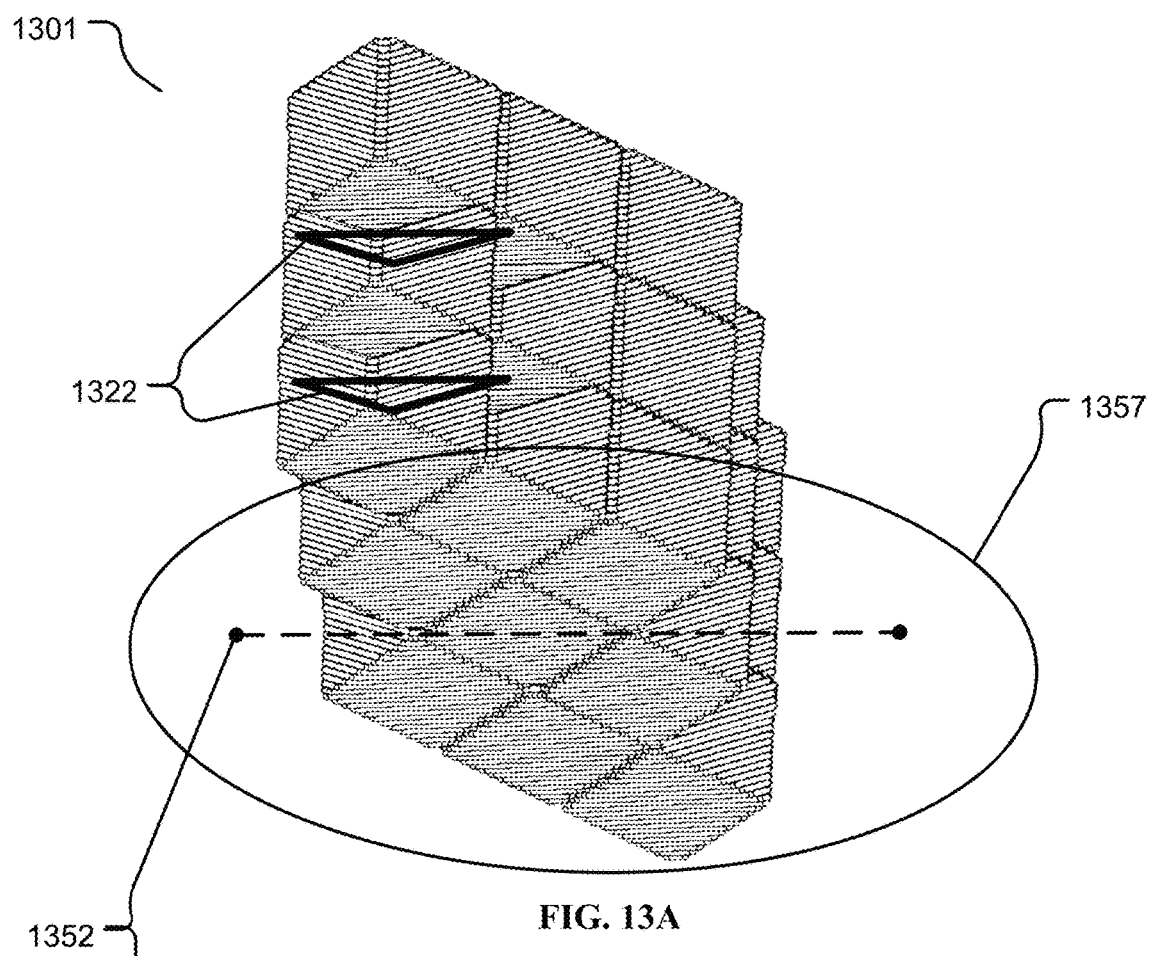
FIGS. 13A and 13B show another self-supporting structure built of packed cubic cells oriented with their diagonals vertical to the print bed.
Figure 13B:
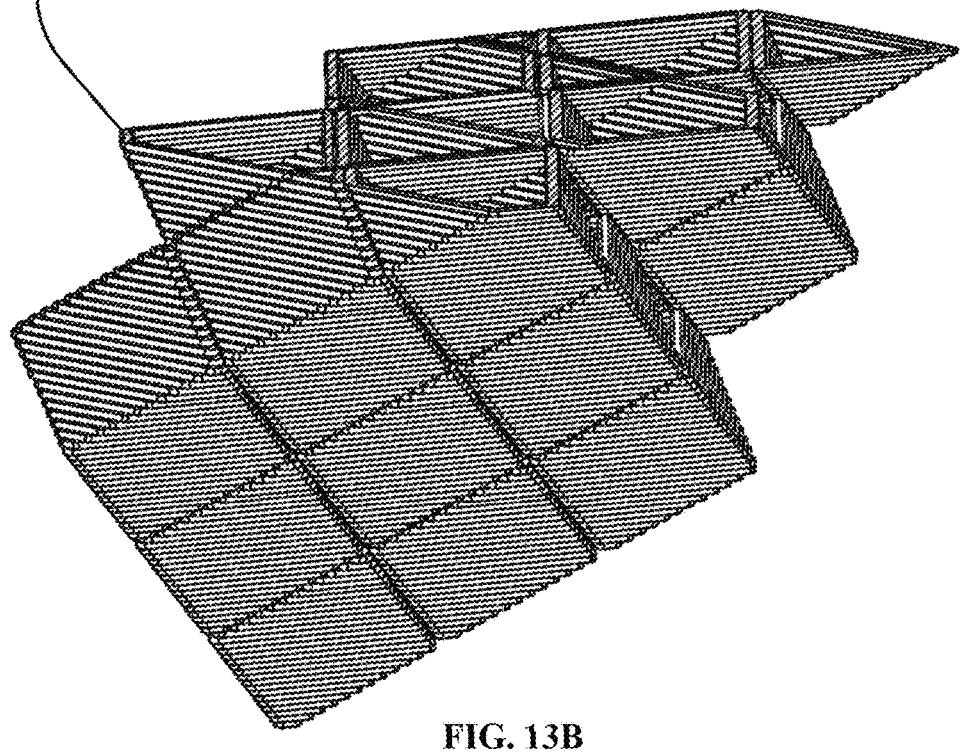

FIGS. 13A and 13B shows a portion of another self-supporting structure 1301 built of packed cubic cells oriented with their diagonals vertical to the print bed. Note that the cube walls are sloped with respect to the print bed and adjacent cells can share walls where they pack against each other. This arrangement results in the cell walls being made with polyhedral contours 1322 as can be seen in FIG. 13A. 1322 outlines horizontal contours on cutaway views of two of the cubes.

FIG. 13B shows a cutaway perspective view of FIG. 13A to illustrate a tool path that comprises contours and traverses several cells. Further, in successive layers the contours are offset to the previous layer to create sloping walls that converge to form essentially closed cells. 1352 is the edge of the plane used to create the cutaway view 1357 shown in FIG. 13B.

This type of structure is called a tessellation since it is a three dimensional "tiling" of cells which have no gaps and no overlaps. There are many kinds of tessellations, some with many different shapes and some with identical shapes. Others can repeat a fixed number of shapes such as a tetrahedron and octahedron. In this example the cell is cube. However, other regular solid and rhombic shapes, and combinations thereof are possible and will be apparent to those skilled in the art.

In an alternate embodiment using essentially closed cells, gaps may be allowed between the cells. In another embodiment, non-tessellating shapes could be used. Either of these alternative structures would still offer increased insulating properties via restricting convective flow as opposed to uninterrupted vertical columns.

Figure 14B:
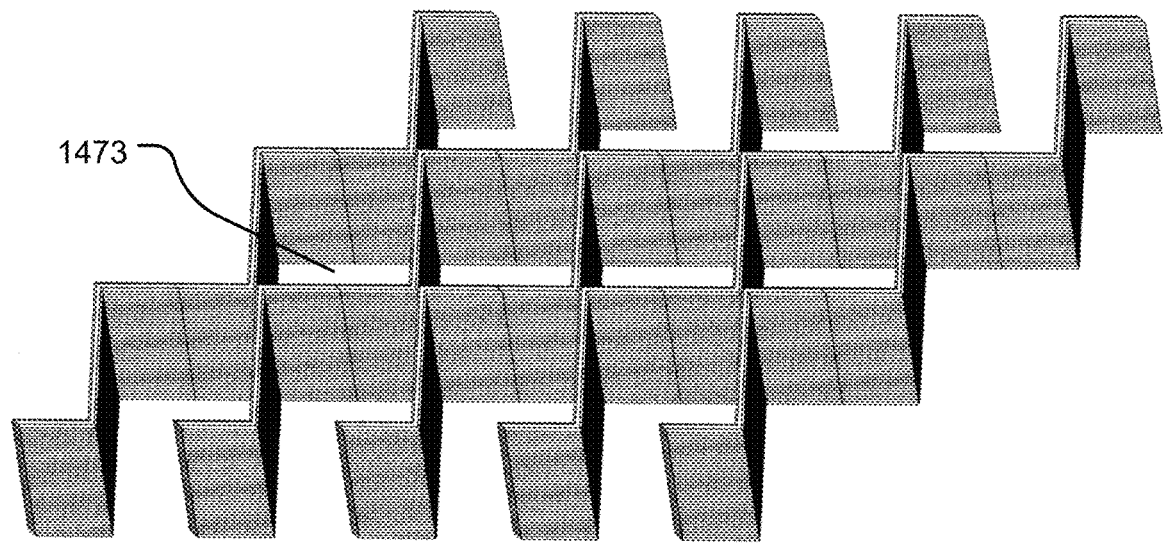

FIGS. 14A and 14B show hexagonal and square self-supporting structures that form vertical columns. While these structures can form insulating volumes 1412 and 1473, they cannot be covered effectively by bridging strands over their open tops. If support material were used to permit bridging strands to be deposited to avoid sagging or breaking, the resulting cells would be closed and there would be no way to remove the supporting material. Therefore, these structures can be subject to vertical convection flows along their height and this can result in thermal loss and thermal gradients.

Figure 15A:
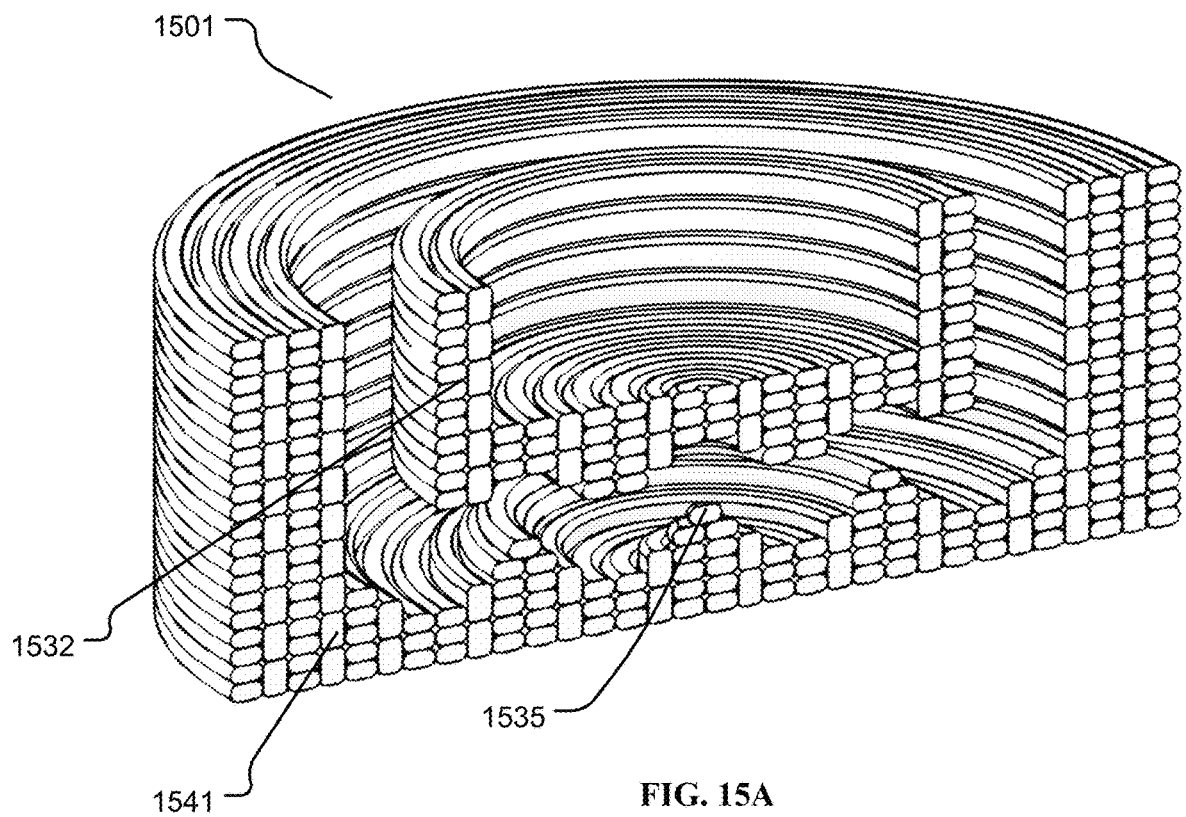
FIGS. 15A and 15B show how a circular airtight base made with offset contours can be embedded within two concentric cylinders to form a bottom portion of an airtight compartment.
Figure 15B:
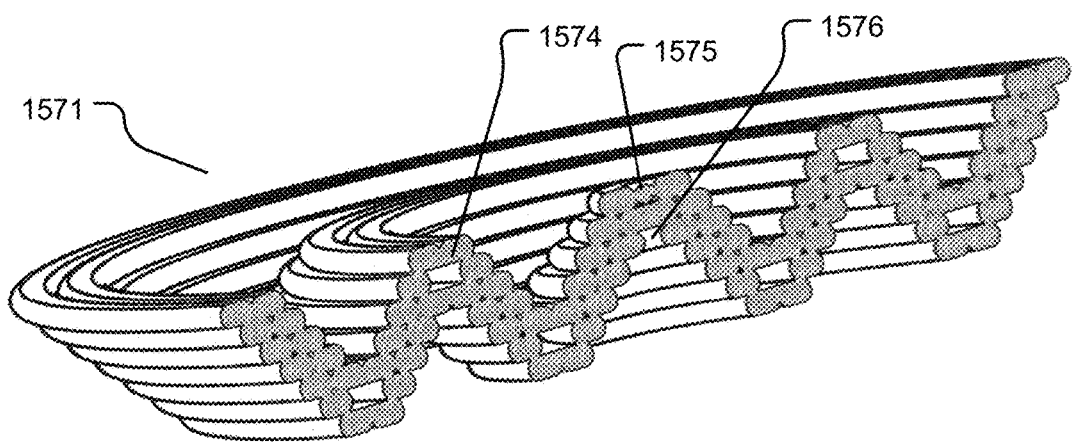

FIGS. 15A and 15B show how a base 1501 comprised of a circular airtight cap structure 1571 can be made entirely of offset contours, then embedded within two concentric cylinders 1541 and 1532 to form a bottom portion of an airtight compartment. Central contour 1535 aligns with the gap 1576 under bridged contours 1575 to complete the assembly. 1574 also illustrates the use of bridging.

An arrangement like this can be used to form an airtight pressure wall within a part. For additional effectiveness it can be combined with overfilling. Further, by embedding an airtight wall or cap structure, dimensional accuracy and other surface characteristics can be maintained with respect to the finished part. Additionally, this arrangement may be used with one wall adjoining to the airtight structure.

The tool path and number of circuits for the airtight cap structure can be calculated by the slicer server and automatically laid out given contour cross-sections for the thermopolymer filament material to be deposited and width of the structure.

Figure 16A:
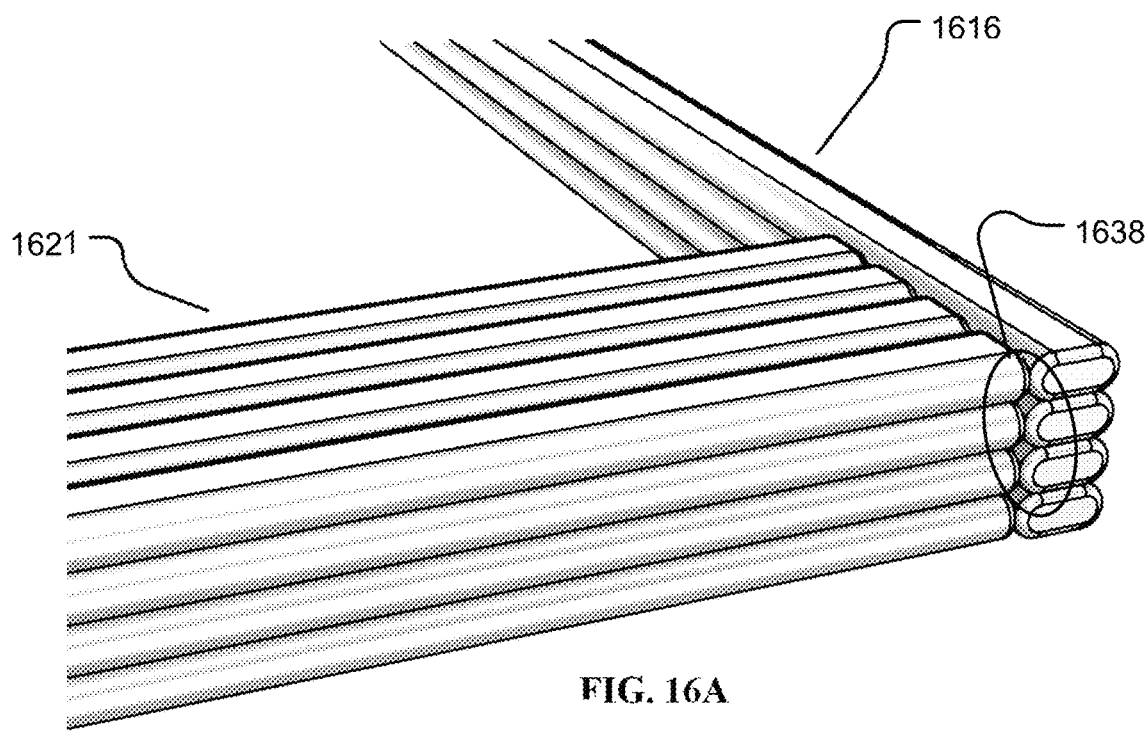
FIGS. 16A, 16B, 17A, 17B, 18A and 18B illustrate more details of leak paths resulting from 3D fused deposition modeling printers.

FIG. 16A shows a perspective view of additional details of a horizontal leak path 1638 that is inherent in the conversion of a solid geometry part representation to a 3D printer build file. This path is formed when layers of a raster fill pattern 1621, meet and terminate at a stack of contours or roads 1616. Zig-zag fill patterns as shown in 365 of FIG. 3 can form similar leak paths, as can any fill pattern in which roads are printed adjacent to each other. Additionally, if these roads are aligned with roads on adjacent layers, the void can increase and even double in size as shown in 1875 versus 1885 in FIG. 18.

Figure 16B:
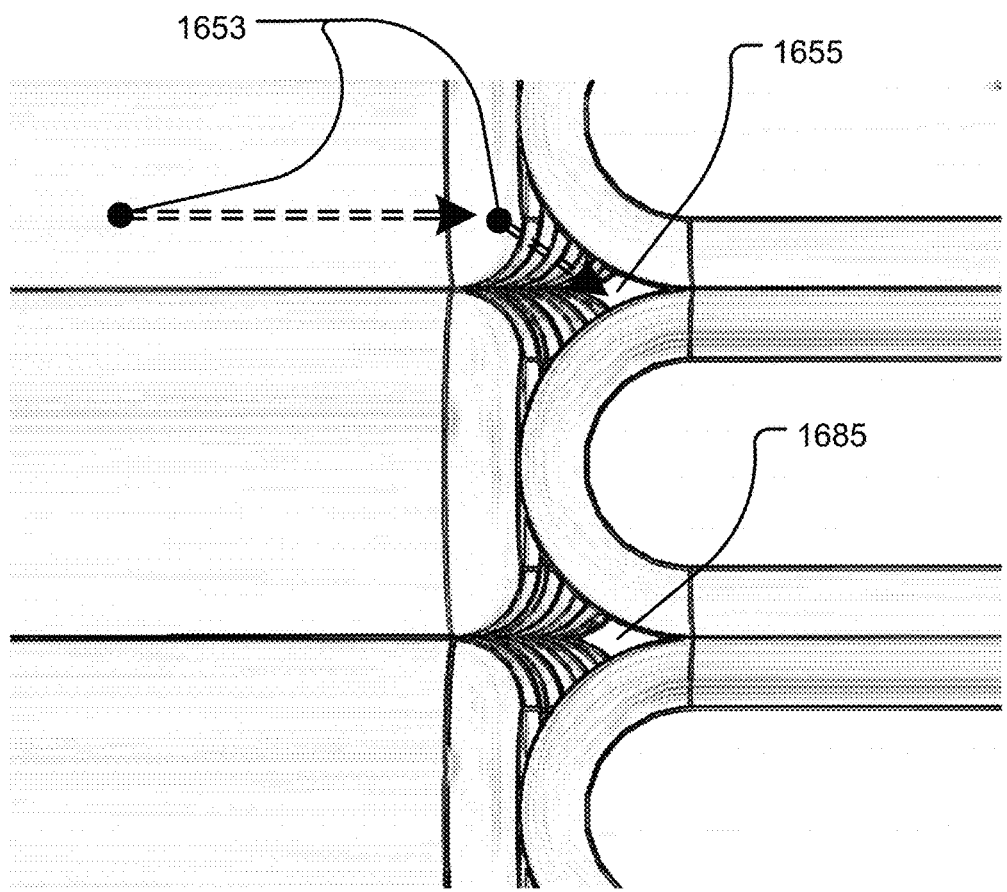

FIG. 16B is a front view of two of the horizontal leak paths 1638 shown in FIG. 16A. 1655 and 1685 indicate the interstices running along horizontal seams parallel to stacked contours or roads 1616. The dashed arrows 1653 illustrate the transition from a horizontal leak path running along the long axis of adjacent roads, 1846 in FIG. 18, to a horizontal leak path running across the ends of several roads but along the long axis of the contours 1616. These contours may also be part of an adjacent raster fill pattern.

Figure 17A:
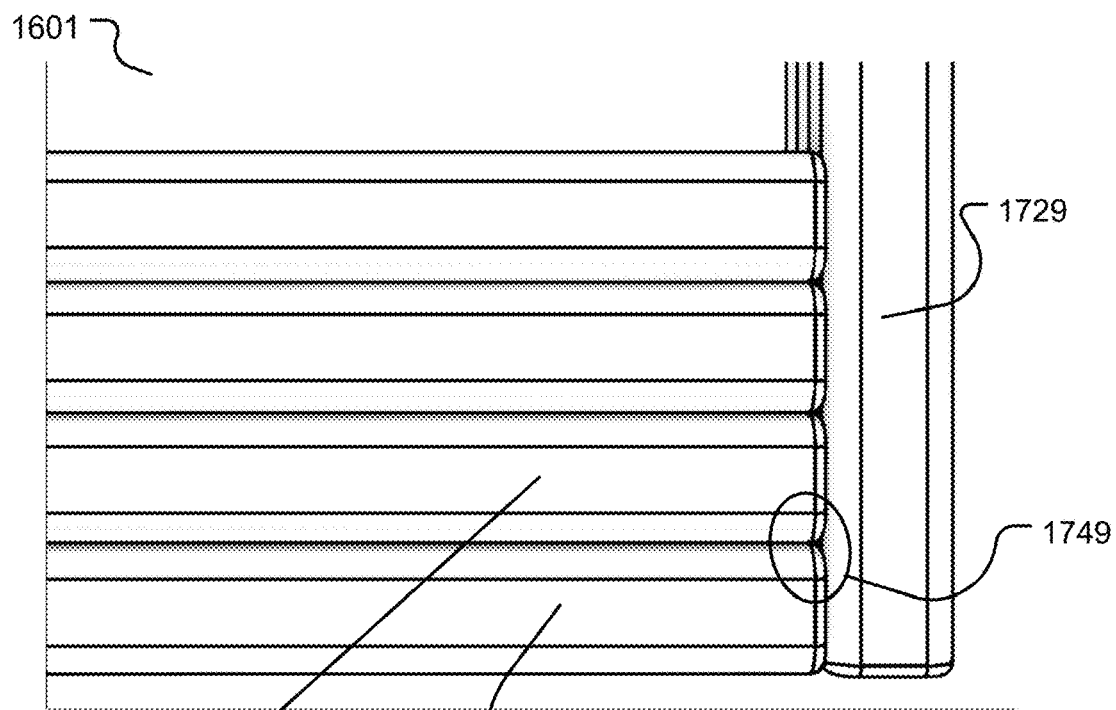
Figure 17B:
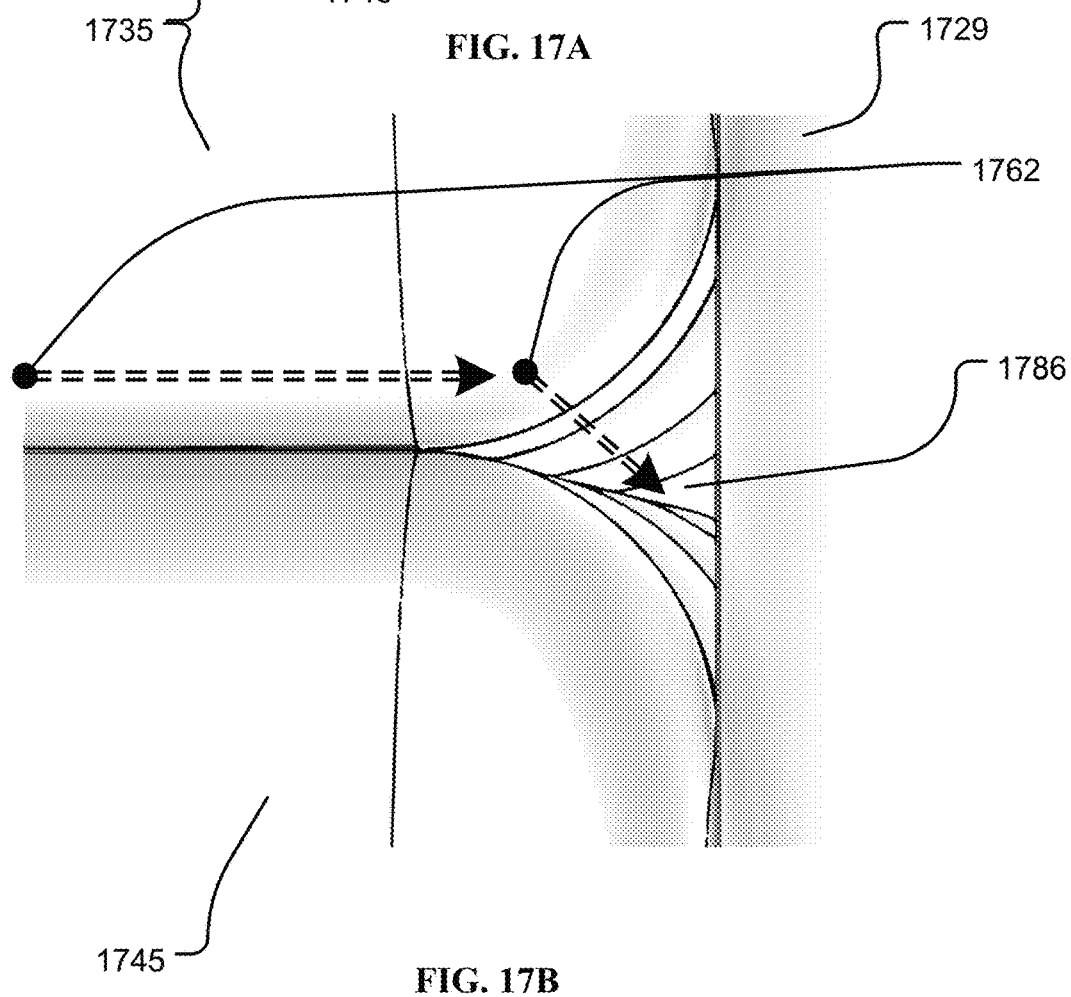

FIG. 17A is a top view similar to FIG. 16A except that horizontal leak paths that can form along the length of adjacent roads, indicated in this example by 1739 and 1749, are transitioned to vertical leaks as indicated by 1749. The dashed arrows 1762 in FIG. 17B show an enlarged top view of this possible leakage path through the vertical void that forms along stacked roads or contours 1729 indicated by 1786. Further, if there is a gap between the strands 1735 and 1745 similar to the one shown in FIG. 5 then the fluid may flow into an adjacent layer.

Figure 18A:
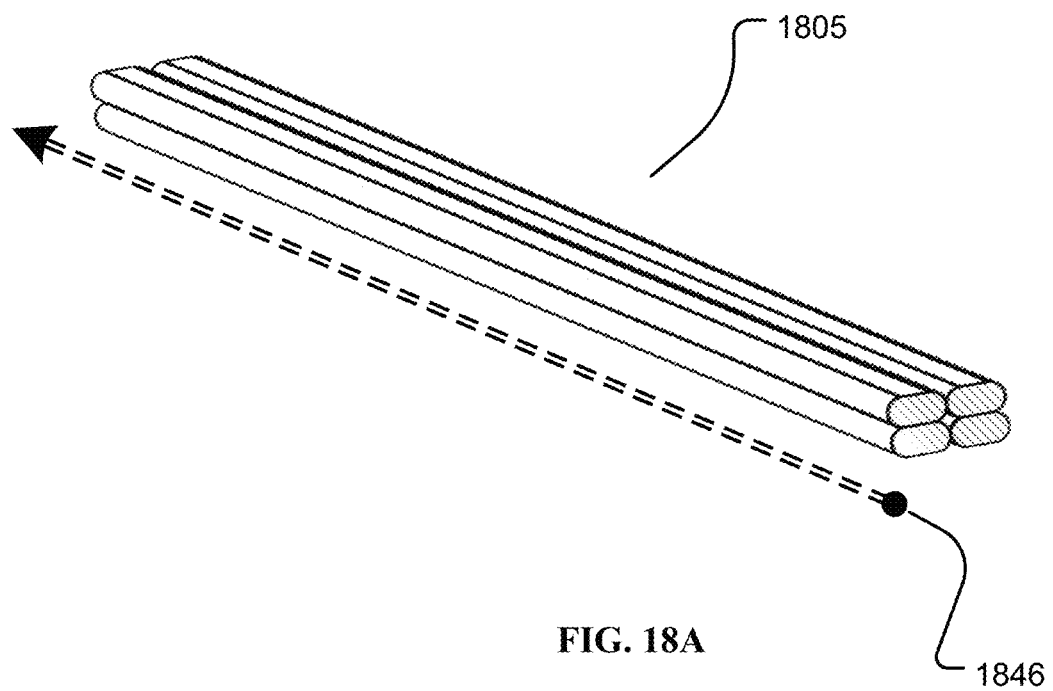
Figure 18B:
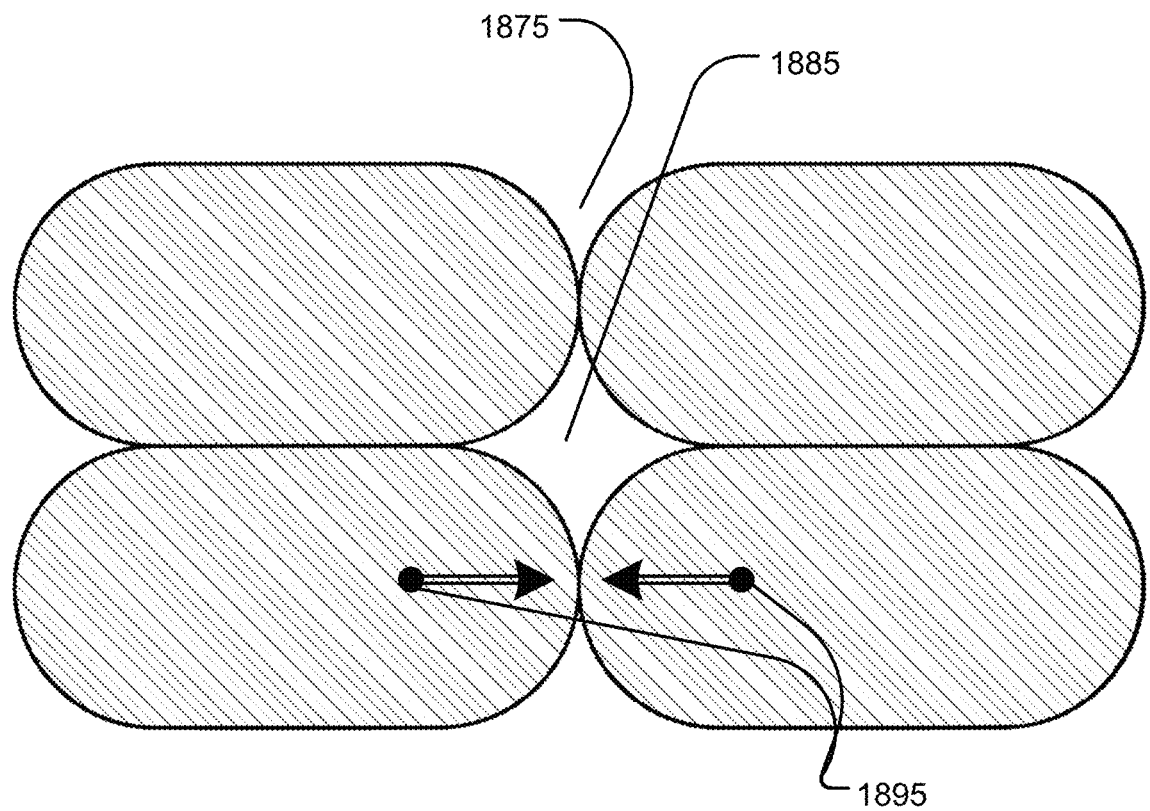

FIGS. 18A and 18B show an example of a continuous gap that is created between two adjacent strands of filament, also called "roads," on the same layer. 1805 shows two layers of two strands. The direction of the gap, indicated by the dashed arrow 1846, is along the length (long axis) of the filaments in the XY (horizontal) plane. As the filament is extruded it assumes the shape of a flattened circle. In some fused deposition printers, the extruder nozzle is positioned to press down on the melted filament to facilitate better bonding to the layer below by flattening the filament and thereby increasing the available bonding area while improving contact.

Nonetheless, the rounded edges of the strands as they are extruded make most of their contact along the faces of the curved edges that are in direct contact, indicated by the arrows 1895. This arrangement creates voids 1875 and 1885 in FIG. 18B between roads on the same and adjacent layers. These types of voids can be continuous for the full length of the roads as shown by the dashed arrow 1846, or a major portion thereof. Thus a partial or continuous horizontal leak path may be formed, and if it abuts another road as in 1749 of FIG. 17A then the leak may transition to a vertical path 1762 in FIG. 17B.

Figure 19A:
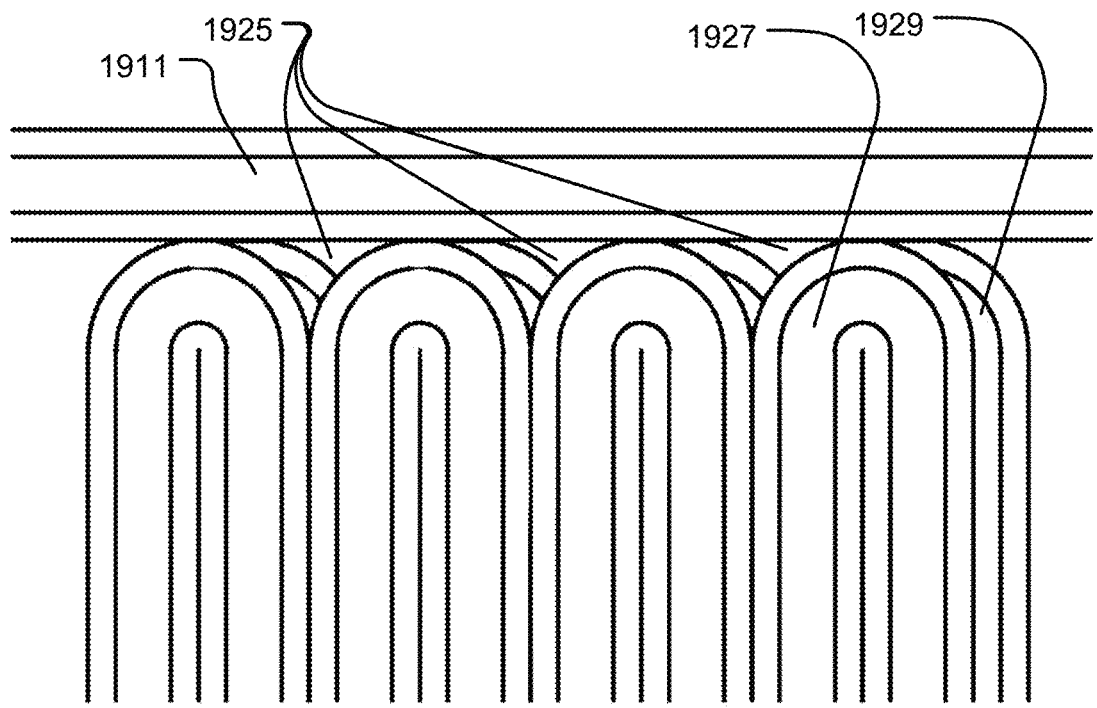
FIGS. 19A and 19B show how the horizontal seams along strands in a layer can be offset from an underlying layer to block gaps that form when a given strand in either layer bonds poorly with adjacent strands on the same layer.

FIG. 19A shows a top view of horizontal seams along strands in a layer can be offset from an underlying layer to cover gaps that can form when a given strand in either layer bonds poorly with adjacent strands on the same layer. 1911 is a stack of contours. 1927 and 1929 are overlaid and offset zig-zag raster patterns. 1925 shows where gaps occur.

Figure 19B:
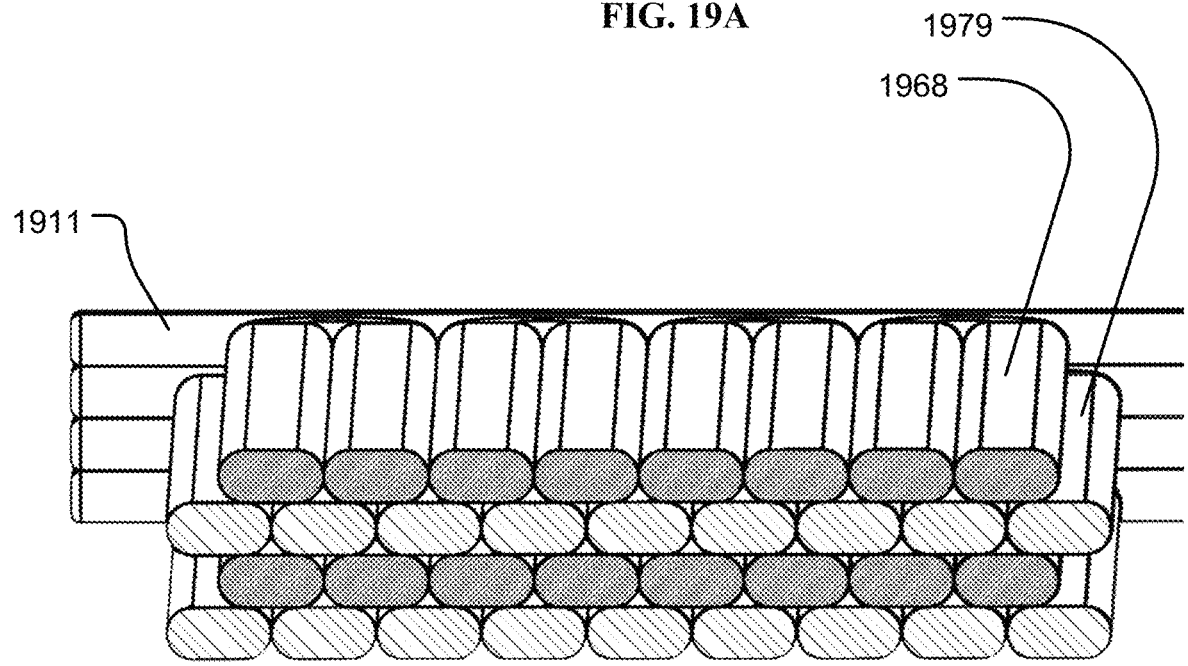

FIG. 19B is a perspective view showing a cross section of the top two overlapped layers 1968 and 1979.

Figure 20A:
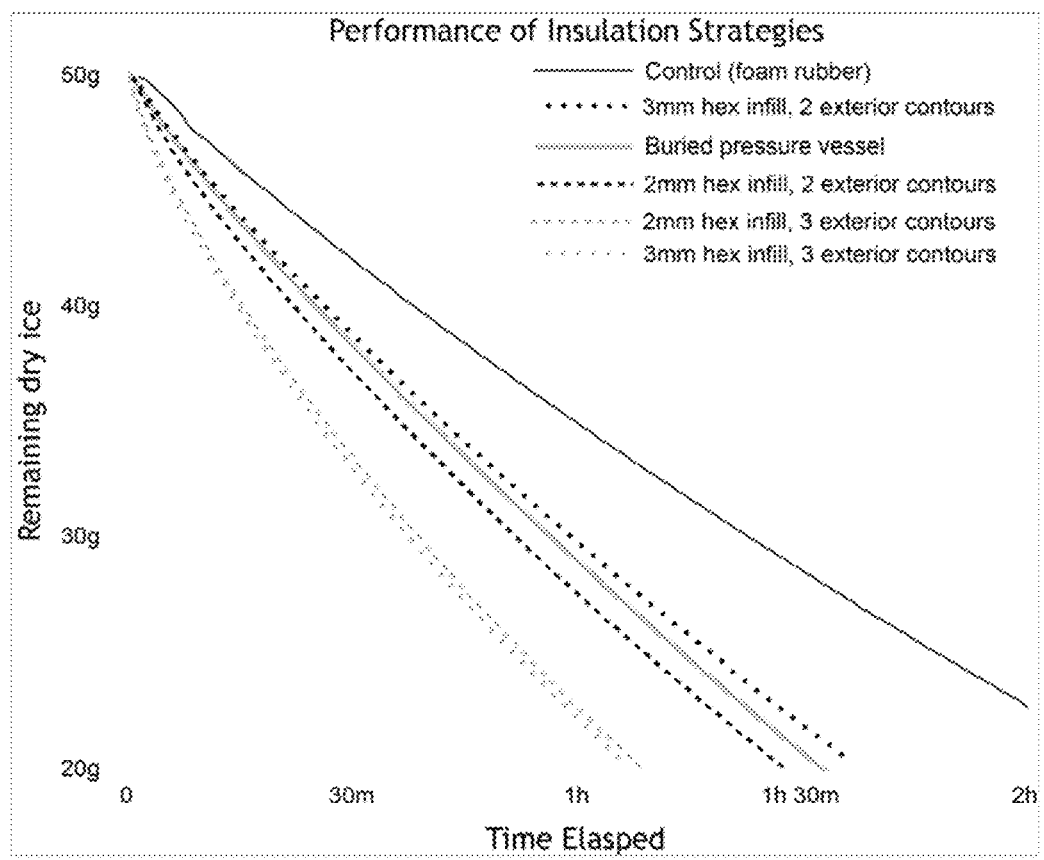
FIG. 20A shows the relative performance of various insulation strategies.

FIG. 20A shows the relative performance of various insulation strategies. The control used as a reference in this experiment, indicated by the solid dark line, was a section of 2⅛th inch tubular foam rubber pipe insulation approximately five inches long, with a wall thickness of ½ inch and a heat flow rate (K-Factor) of 0.25 at 75 degrees Fahrenheit. For the four tests that used hexagonal infill, cups of the same dimensions were 3D printed using a fused deposition modeling printer. Each of these cups was infilled with the hexagonal pattern shown in FIG. 14A. The hexagonal cells had a cirumradius (an outside radius) of either 2 mm or 3 mm as indicated in the legend. The wall thickness was either one road width (0.015 inches) or two road widths (0.030 inches). Either two or three exterior contours per layer were used to contain the hex infill, again as indicated in the legend. FIG. 15A shows a cross section that illustrates the use of concentric contours.

The "buried" pressure vessel, indicated by the light gray line in FIG. 20A, was 3D printed with outer 1541 and inner 1532 walls comprised of concentric contours as shown in FIG. 15A. A cylinder printed with concentric contours (not shown) and having a bottom comprised of contours forming a triangular cross section as shown for 1571 was embedded between the outer 1541 and inner 1532 walls.

Each of these six test containers was filled with 50 grams of crushed dry ice and weighed at intervals to measure the weight of the remaining dry ice over time. The results were recorded and graphed as shown in FIG. 20A to provide a relative indication of the performance of various infill strategies versus the control.

Figure 20B:
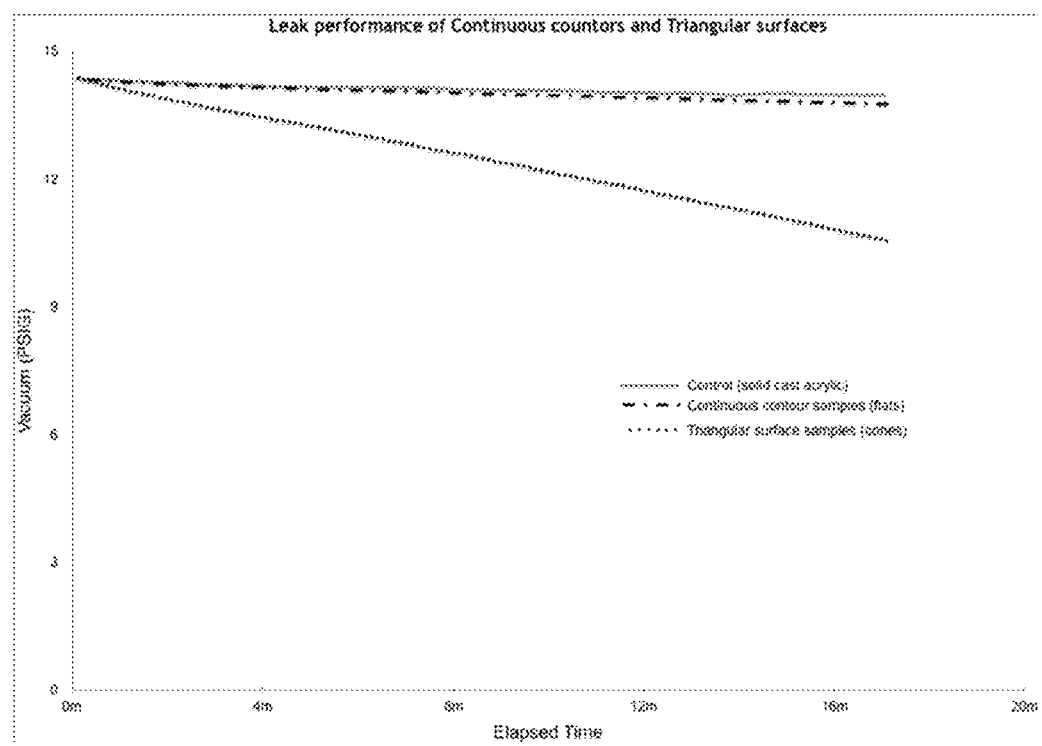
FIG. 20B shows the leak performance of continuous contours and triangulated three-dimensional surfaces versus cast acrylic.

FIG. 20B shows the leak performance of continuous contours and triangulated three dimensional surfaces versus cast acrylic. The test setup consisted of an acrylic sheet connected to a vacuum gauge and a vacuum pump. The test specimen was either a three layer disc printed with continuous contours as in FIGS. 6D and 6E, or a triangulated three dimensional surface printed with walls two contours thick as in FIG. 1D. The control was a piece of cast acrylic.

The results from the three layer disc printed with continuous contours show that it is possible to achieve excellent performance close to that of cast acrylic. Note that these tests used prototypes and that future refinements would likely improve the performance of both techniques.

Environmental Chamber Use Case

The technology disclosed can be used to produce practical devices whose functionality embodies both airtight walls and insulating walls for use in many different settings.

Consider a space station with extreme limits on resources and materials. One of the problems that would likely be present is the capability to contain an atmosphere. This requires some type of airtight assembly. Another requirement, given the extreme temperatures in space and on other extraterrestrial surfaces like planets or moons, is the ability to create and maintain these temperatures for environmental testing. Hence the use of insulation to minimize thermal fluctuations.

The prototype example shown here exemplifies the use of the technology disclosed to solve these problems. It is an environmental chamber that was built to emulate the environment on the surface of Mars. It was tested and proved capable of holding a vacuum up to up to approximately. See FIG. 21 for details.

The chamber and shell were 3D printed from ABS (acrylonitrile butadiene styrene) which was chosen because it is readily available and well-suited to an initial round of experiments. A chamber that would withstand Martian temperatures could be fabricated from PEI (polyetherimide) which has superior mechanical and thermal properties relative to ABS.

The problem of printing airtight walls for such a chamber is solved by mitigating leaks in 3D fused deposition modeling printed parts. A prevalent cause of leaks in 3D fused deposition modeling printing is raster fill patterns. Reducing or removing the horizontal surfaces that use them with surfaces printed with contours is one of the most effective solutions to accomplish this. FIG. 20 shows the performance of two types of these surfaces as compared to a flat acrylic plate used as a reference.

The technology disclosed can create airtight parts by replacing raster filled horizontal surfaces with tool paths that use contours to mitigate the quantization and grid snap problems that result when a solid geometry is converted to a tool path for a 3D fused deposition modeling printer.

For the environmental chamber, parts were designed with sloped surfaces that move up and sideways with successive layers, thus resulting in a tool path that uses contours. Additionally, slicer software was modified to produce layers made with contours arranged concentrically as shown in FIGS. 6A-6C or as a spiral in FIGS. 6D and 6E. These layers could be stacked in alignment as shown in FIG. 6C. They could also be offset so that the roads in a layer covered the seams between the roads in the layer underneath, and the contour width on the outermost edge could be adjusted to match the edge of the underlying layer to provide a more consistent outer surface.

Particular Implementations

The technology disclosure focuses on remediating leaks, inherent in the 3D fused deposition modeling and printing process, stemming from geometric artifacts and physical defects in material and hardware.

Construction of airtight structures using fused-deposition-modeling involves a number of techniques that are insulating—individually and collectively contributing to airtightness with reduced convection.

In one implementation, a disclosed method of creating an airtight cap structure by additive manufacturing includes depositing, by fused-deposition-modeling, first concentric base contours; and spanning distance(s) that separate the first concentric contours by depositing, by fused-deposition-modeling, first cantilevered contour layers over the first base contours. A contour in an overlaying cantilevered contour layer is fused in contact with the contour in an immediately underlying layer and overlaps the contour in the immediately underlying layer by at least 40 percent of the overlaying contour's width. The disclosed method further includes, nested in a relief defined by the first cantilevered contour layers, depositing—by fused-deposition-modeling—second concentric base contours approximately above the first concentric base contours, and second cantilevered contour layers spanning the second base contours, fused in contact with both the contour in the immediately underlying layer and with a concentric contour in a coplanar first cantilevered contour layer.

For the disclosed method, contours deposited in an underlying coplanar layer are deposited before contours in an overlaying coplanar layer, for both the first and second base contours and cantilevered contour layers.

The disclosed method further includes depositing doublewide base contours. In some implementations, the relief defined by the first cantilevered layers is "V" shaped. In some implementations of the disclosed method, concentric contours, deposited in the underlying contour layer, are deposited in a pattern from distal to proximate to a center of the airtight cap structure. In some implementations, concentric contours, deposited in the underlying contour layer, are deposited in a pattern from proximate to distal to a center of the airtight cap structure.

The disclosed method also includes defining one or more vents in the airtight cap structure with gaps in the deposited contours. The method further includes radially distributing end-butt joints in deposited concentric contours to avoid alignment between the end-butt joints in both vertically and horizontally adjoining concentric contours.

In one implementation, a disclosed slicer server generates a build file for creating an airtight cap structure of polymer material deposited by fused-deposition-modeling. The slicer server includes a processor and memory coupled to the processor, with the memory holding instructions that, when executed on the processor, cause the slicer server to accept input that specifies: a contour cross-section or range of contour cross-sections for material to deposit by fused-deposition-modeling, a base width of the airtight cap structure, and a number or range of numbers of concentric base contours. The disclosed slicer server, based on the base width and the number(s) of concentric base contours, calculating spacing of the concentric base contours. The server, based on spacing of the concentric base contours and the contour cross-section(s), calculating a number of cantilevered contour layers to span distance(s) the base contours with overlap between an overlaying contour and an underlying contour in an immediately underlying layer by at least 40 percent of the overlaying contour's width. Further disclosed, the slicer server automatically laying out tool paths and deposition parameters that specify deposition of: first concentric base contours; spanning the first concentric base contours by first cantilevered contour layers over the first concentric base contours; nested in a relief shape within the first cantilevered contour layers, second concentric base contours approximately above the first concentric base contours and second cantilevered contour layers spanning the second base contours, fused in contact with the contour in the immediately underlying layer and with a concentric contour in a coplanar first cantilevered contour layer. Further disclosed, the automatic laying out radially distributes positions of end-butt joints in the concentric contours to avoid alignment between the end-butt joints in both vertically and horizontally adjoining concentric contours; and outputting a build file containing the layout of the tool paths and the deposition parameters for building the airtight cap structure.

For some implementations, the disclosed slicer server tool paths for contours deposited in an underlying coplanar layer specify deposition of the underlying layer before contours in an overlaying coplanar layer. Some implementations further include tool paths that deposit doublewide base contours. For some disclosed slicer servers, the relief defined by the first cantilevered layers is "V" shaped; and tool paths for concentric contours deposited in the underlying contour layer specify deposition in a pattern from distal to proximate to a center of the airtight cap structure. In one implementation, tool paths for concentric contours deposited in the underlying contour layer specify deposition in a pattern from proximate to distal to a center of the airtight cap structure. Inputs and tool paths further define one or more vents in the airtight cap structure by gaps in the deposited material. Some disclosed slicer servers include automatically radially distributing end-butt joints in tool paths of the concentric contours to avoid alignment between the end-butt joints in both vertically and horizontally adjoining concentric contours.

In one implementation, a disclosed airtight cap structure, manufactured by additive manufacturing, includes first concentric base contours of polymer deposited by fused-deposition-modeling; first cantilevered contour layers over the first base contours, deposited by fused-deposition-modeling, which span the first concentric contours. Contours in overlaying cantilevered contour layers are fused in contact with the contour in a respective immediately underlying layer and overlap the contour in the respective immediately underlying layer by at least 40 percent of the overlaying contour's width. The disclosed airtight cap structure also includes, nested in a relief defined by the first cantilevered contour layers, additional polymers deposited by fused-deposition-modeling: second concentric base contours approximately above the first concentric base contours and second cantilevered contour layers spanning the second base contours, fused in contact with both the contour in the immediately underlying layer and with a concentric contour in a coplanar first cantilevered contour layer.

The disclosed airtight cap further includes one or more vents in the airtight cap defined by gaps in the deposited contours. The airtight cap can further include radially distributed end-butt joints in deposited concentric contours, distributed with non-alignment between the end-butt joints in both vertically and horizontally adjoining concentric contours.

One implementation includes a method of forming contour layers of polymer deposited by fused deposition modeling in a pattern that mitigates leakage along planes between adjoining overlaid layers. The disclosed method includes depositing by fused deposition modeling a modified finger joint among three polymer layers: a first layer having an upper bound plane, a third layer having a lower bound plane coincident with the upper bound plane of the first layer, and a second layer of interstitial fingers that project into the first and third layers. The disclosed method includes the depositing implemented by a first combination of tool path and material extrusion parameters producing the first layer including a first trench extending into the first layer from the upper bound plane; a third combination of tool path and material extrusion parameters producing the third layer including a third trench over the first trench; and a second combination of tool path and material extrusion parameters producing the second layer of interstitial fingers that fill in the first and third trenches, extending across the first layer upper bound plane and third layer lower bound plane, mitigating horizontal migration of fluid through a seam between the first and third layers. In some implementations of the disclosed method, the first trench is a full height of the first layer, the third trench is a full height of the third layer, and the interstitial fingers of the second layer are a full height of the first plus third layers. In other implementations, the first trench is a partial height of the first layer, the third trench is a full height of the third layer, and the interstitial fingers of the second layer are a full height of the first plus third trenches. The disclosed method can further include a fourth layer directly over the third layer, depositing of the fourth layer implemented by a fourth combination of tool path and material extrusion parameters producing the fourth layer including a fourth trench over the third trench. In this implementation, the first trench is a partial height of the first layer; the third trench is a full height of the third layer; the interstitial fingers of the second layer are a full height of the first plus third trenches plus an additional height extending into the fourth layer; and the fourth trench is a complementary partial height of the fourth layer that fills in over the interstitial fingers.

One disclosed method includes building fingers before a third layer. The disclosed method of forming contour layers of polymer deposited by fused deposition modeling in a pattern that mitigates leakage along planes between adjoining overlaid layers includes depositing by fused deposition modeling a modified finger joint among three successive layers, a first layer having an upper bound plane, a third layer having a lower bound plane coincident with the upper bound plane of the first layer, and a second layer of interstitial fingers that project into the first and third layers. The implemented depositing by a first combination of tool path and material extrusion parameters producing a first layer including a trench extending into the first layer from the upper bound plane. The depositing also includes a second combination of tool path and material extrusion parameters producing the second layer of interstitial fingers that overfills the trench in the first layer to produce an interstitial finger of extruded material that projects into the third layer across the upper bound of the first layer. Further included is a third combination of tool path and material extrusion parameters creating the third layer filling in around the interstitial finger of extruded material that projects into the third layer, thereby defining a third trench, whereby a seam between the first and third layers is interrupted by the second layer of interstitial fingers. For some implementations of the method, the first trench is a full height of the first layer, the third trench is a full height of the third layer, and the interstitial fingers of the second layer are a full height of the first plus third layers. In other implementations, the first trench is a partial height of the first layer, the interstitial fingers of the second layer are a height of the first trenches plus a partial height of the third layer, and the third trench is a complementary partial height of the third layer that fills in over the interstitial fingers.

One disclosed slicer server includes two orderings of layer deposition. The disclosed slicer server generates a build file for creating contour layers of polymer deposited by fused deposition modeling in a pattern that mitigates leakage along planes between adjoining overlaid layers. The slicer server includes a processor and memory coupled to the processor, the memory holding instructions that, when executed on the processor, cause the slicer server to accept input that specifies: a contour cross-section or range of contour cross-sections for material to deposit by fused-deposition-modeling, and a base thickness of layered contour lines patterned to mitigate leakage among between directly overlaid layers. Based on the base thickness and the contour cross-section(s), calculating a number of contour layers required to satisfy the base thickness. The disclosed slicer server includes automatically laying out tool paths and deposition parameters that specify a modified finger joint among three successive polymer layers, a first layer having an upper bound plane, a third layer having a lower bound plane coincident with the upper bound plane of the first layer, and a second layer of interstitial fingers that project into the first and third layers. The depositing is implemented by a first combination of tool path and material extrusion parameters producing the first layer including a first trench extending into the first layer from the upper bound plane; a third combination of tool path and material extrusion parameters producing the third layer including a third trench over the first trench; and a second combination of tool path and material extrusion parameters producing the second layer of interstitial fingers that fill in the first and third trenches, extending across the first layer upper bound plane and third layer lower bound plane, mitigating horizontal migration of fluid through a seam between the first and third layers. Further disclosed is the slicer server outputting a build file containing the layout of the tool paths and the deposition parameters for building the airtight wall structure. In some implementations, the slicer server further includes ordering the second and third combinations of tool path and material extrusion in the build file so that the third trench is formed before the interstitial fingers are deposited to fill in the first and third trenches. In other implementations, the slicer server further includes ordering the second and third combinations of tool path and material extrusion in the build file so that the interstitial fingers are formed filling the first trenches and protruding across the first upper bound plane before the contours defining the third trenches of the third layer are deposited.

One disclosed structure of contour layers of polymer deposited by fused deposition modeling in a pattern that mitigates leakage along planes between adjoining overlaid layers includes a modified finger joint among three successive polymer layers. A first layer has an upper bound plane, a third layer has a lower bound plane coincident with the upper bound plane of the first layer, and a second layer of interstitial fingers project into the first and third layers. The first layer includes a first trench extending into the first layer from the upper bound plane. The third layer includes a third trench over the first trench. the second layer of interstitial fingers fill in the first and third trenches, extending across the first layer upper bound plane and third layer lower bound plane, mitigating horizontal migration of fluid through a seam between the first and third layers.

One disclosed method of creating an airtight wall structure, by additive manufacturing, includes depositing polymer, by fused-deposition-modeling, first concentric base contours that define an underlying base layer, formed with adjoining concentric contours of the base contours fused to adjoining radially inward and/or radially outward contours, with radially distributing end-butt joints in deposited concentric contours, distributed to avoid alignment between the end-butt joints in horizontally adjoining concentric contours. The disclosed method further includes depositing polymer, by fused-deposition-modeling, second concentric contours that are positioned over the underlying base layer, formed with concentric contours of the second concentric contours fused to adjoining radially inward and/or radially outward concentric contours of the second concentric contours, and further fused to an immediately underlying layer, with radially distributing end-butt joints in deposited concentric contours to avoid alignment between the end-butt joints in both horizontally and vertically adjoining concentric contours. In some implementations the radially distributed end-butt joints are linearly separated along respective outer contour perimeters, between a first joints and respective nearest second joints in horizontally and vertically adjoining concentric contours, by at least five times widths of respective contours that define the first joints.

Using an airtight wall created using the method described, in some cases, a disclosed method can be extended to creating an airtight cap structure includes concentric contours from a center of the airtight cap structure to an outer perimeter of the airtight cap structure. The disclosed method further includes depositing a plug at a center of the airtight cap structure sealing a gap at a center of a radially inner most concentric contour.

In other disclosed implementations for creating an airtight wall structure, second concentric contours are directly overlying contours of the immediately underlying layer, with an overlap of at least 90 percent of a width of respective contours among the second concentric contours. In another implementation, second concentric contours are cantilevered over contours of the immediately underlying layer, with an overlap of at least 40 percent of a width of respective contours among the second concentric contours. In yet another disclosed implementation, the radially distributed end-butt joints are linearly separated along respective outer contour perimeters, between a first joints and respective nearest second joints in horizontally and vertically adjoining concentric contours, by at least two times widths of the respective contours that define the first joints. In some disclosed cases, contours describe a polygon. In other cases, contours describe an oval.

One disclosed slicer server generates a build file for creating an airtight wall structure of polymer material deposited by fused-deposition-modeling. The slicer server includes a processor and memory coupled to the processor, the memory holding instructions that, when executed on the processor, cause the slicer server to accept input that specifies a contour cross-section or range of contour cross-sections for material to deposit by fused-deposition-modeling, a base width of the airtight wall structure, and a thickness of the airtight wall structure. Based on the base width and the contour cross-section(s), the slicer server calculates a number of contours required to satisfy the thickness of the airtight wall structure. The slicer server automatically lays out tool paths and deposition parameters that specify deposition of first concentric base contours that define an underlying base layer and that cause adjoining contours of the first concentric base contours, when deposited, to fuse to adjoining radially inward and/or radially outward contours of the first concentric contours, with radially distributing end-butt joints in deposited concentric contours, distributed to avoid alignment between the end-butt joints in horizontally adjoining concentric contours; second concentric contours positioned over the underlying base layer and that causes adjoining contours of the second concentric contours, when deposited, to fuse to radially inward and/or radially outward contours of the second concentric contours and to fuse to an immediately underlying layer of concentric contours. Also included is the slicer server radially distributing end-butt joints in deposited concentric contours to avoid alignment between the end-butt joints in both horizontally and vertically adjoining concentric contours. A plug at a center of an airtight cap structure sealing a gap between a radially inner most butt-end of the first and second concentric contours and adjoining portions of the first and second concentric contours. Further, the slicer server outputs a build file containing the layout of the tool paths and the deposition parameters for building the airtight wall structure. In some disclosed implementations, further accepts input specifying a default or user specified joint-separation-distance, and automatically laying out the radially distributed end-butt joints in the tool paths with outer perimeter linear separations that to satisfy the joint-separation-distance, by separating respective first joints and nearest respective second joints in horizontally and vertically adjoining concentric contours, of at least the joint-separation-distance. For some implementations, the disclosed slicer server can further automatically lay out the radially distributed end-butt joints in the tool paths with outer perimeter linear separations, between a first joints and respective nearest second joints in horizontally and vertically adjoining concentric contours, of at least two times widths of the respective contours that define the first joints.

For a disclosed slicer server that outputs a build file for an airtight cap structure, using tool paths for an airtight wall automatically laid out according to the slicer server described above, tool paths for the airtight cap structure include concentric contours from a center of the airtight cap structure to an outer perimeter of the airtight cap structure, the tool paths further including depositing a plug at a center of the airtight cap structure sealing a gap at a center of a radially inner most concentric contour. Some implementations of the slicer server further include laying out second concentric contours directly overlying contours of the immediately underlying layer, with an overlap of at least 90 percent of a width of respective contours among the second concentric contours. In one implementation, the disclosed slicer server further includes laying out second concentric contours cantilevered over contours of the immediately underlying layer, with an overlap of at least 40 percent of a width of respective contours among the second concentric contours. In some cases, the first concentric base contours describe a polygon. In other cases, the first concentric base contours describe an oval.

In one implementation, a disclosed airtight wall structure, manufactured by additive manufacturing, includes first concentric base contours of polymer deposited by fused-deposition-modeling that define an underlying base layer, formed with adjoining portions of the first concentric base contour fused to adjoining radially inward and/or radially outward contours, with radially distributing end-butt joints in deposited concentric contours, distributed to avoid alignment between the end-butt joints in horizontally adjoining concentric contours. The disclosed wall structure also includes second concentric contours of polymer deposited by fused-deposition-modeling that are positioned over the underlying base layer, formed with adjoining concentric contours of the second concentric contours fused to adjoining radially inward and/or radially outward concentric contours of the second concentric contours, further fused to an immediately underlying layer, with radially distributing end-butt joints in deposited concentric contours to avoid alignment between the end-butt joints in both horizontally and vertically adjoining concentric contours. In some implementations, the radially distributed end-butt joints are linearly separated along respective outer contour perimeters, between a first joints and respective nearest second joints in horizontally and vertically adjoining concentric contours, by at least five times widths of the respective contours that define the first joints.

In other implementations, an airtight cap structure, using the disclosed airtight wall structure, further includes concentric contours from a center of the airtight cap structure to an outer perimeter of the airtight cap structure. The airtight wall structure further includes a plug at a center of the airtight cap structure sealing a gap at a center of a radially inner most concentric contour. In some implementations of the disclosed airtight wall structure, second concentric contours are directly overlying contours of the immediately underlying layer, with an overlap of at least 90 percent of a width of respective contours among the second concentric contours.

In other implementations of the disclosed wall structure, second concentric contours are cantilevered over contours of the immediately underlying layer, with an overlap of at least 40 percent of a width of respective contours among the second concentric contours. In one implementation of the disclosed wall structure, the radially distributed end-butt joints are linearly separated along respective outer contour perimeters, between a first joints and respective nearest second joints in horizontally and vertically adjoining concentric contours, by at least two times widths of the respective contours that define the first joints. In some cases, for the airtight wall structure, contours describe a polygon. In other cases, they describe an oval.

In one implementation, a disclosed method of creating an airtight cap structure, by additive manufacturing, includes depositing polymer, by fused-deposition-modeling, a first continuous contour that defines an underlying base layer formed with adjoining portions of the first continuous contour fused to both radially inward and radially outward portions of the first continuous contour. The disclosed method also includes depositing polymer, by fused-deposition-modeling, a second continuous contour that is positioned over the underlying base layer formed with adjoining portions of the second continuous contour fused to radially inward and radially outward portions of the second continuous contour and further fused to the underlying base layer. The method further includes depositing a plug at a center of airtight cap structure seals a gap between a radially inner most butt-end of the first and second continuous contours and adjoining portions of the first and second continuous contours. In some cases, contours describe a spiral with sections of the second continuous contour directly overlying sections of the underlying base layer. The spiral can be deposited in a pattern from distal to proximate to a center of the airtight cap structure. In other cases, the spiral is deposited in a pattern from proximate to distal to a center of the airtight cap structure. In some implementations, the disclosed method further includes tapering polymer deposited in at least a radially outmost ring of the continuous contour with a tool path that positions the tapered polymer deposit so that it fuses with an adjoining radially inward portion of the continuous contour. For some implementations of the disclosed method, contours describe a spiral with sections of the second continuous contour centered between sections of the underlying base layer. In some cases, contours describe a polygon with sections of the second continuous contour directly overlying sections of the underlying base layer. In other cases, contours describe a polygon with sections of the second continuous contour centered between sections of the underlying base layer.

In one implementation, a slicer server generates a build file for creating an airtight cap structure of polymer material deposited by fused-deposition-modeling. The slicer server includes a processor and memory coupled to the processor, the memory holding instructions that, when executed on the processor, cause the slicer server to accept input that specifies a contour cross-section or range of contour cross-sections for material to deposit by fused-deposition-modeling and a base width of the airtight cap structure. The executed instructions also cause the slicer server, based on the base width and the contour cross-section(s), calculating a number of circuits of continuous contour required to fill the base width; automatically laying out tool paths and deposition parameters that specify deposition of a first continuous contour that defines an underlying base layer and that causes adjoining portions of the first continuous contour, when deposited, to fuse to both radially inward and radially outward portions of the first continuous contour, a second continuous contour positioned over the underlying base layer and that causes adjoining portions of the second continuous contour, when deposited, to fuse to both radially inward and radially outward portions of the second continuous contour and to fuse to the underlying base layer, and a plug at a center of airtight cap structure sealing a gap between a radially inner most butt-end of the first and second continuous contours and adjoining portions of the first and second continuous contours. The executed instructions also cause the slicer server to output a build file containing the layout of the tool paths and the deposition parameters for building the airtight cap structure. In some cases, contours in the tool path describe a spiral with sections of the second continuous contour directly overlying sections of the underlying base layer. In one implementation, the spiral is deposited in a pattern from distal to proximate to a center of the airtight cap structure. In another implementation, the spiral is deposited in a pattern from proximate to distal to a center of the airtight cap structure. In some cases, the automatically laid out tool path and deposition parameters further taper polymer deposited in at least a radially outmost ring of the continuous contour with a tool path that positions the tapered polymer deposit so that it fuses with an adjoining radially inward portion of the continuous contour. In some cases, contours in the tool path describe a spiral with sections of the second continuous contour centered between sections of the underlying base layer. In other cases for the disclosed slicer server, contours in the tool path describe a polygon with sections of the second continuous contour directly overlying sections of the underlying base layer. In some cases, contours in the tool path describe a polygon with sections of the second continuous contour centered between sections of the underlying base layer.

A disclosed airtight cap structure, manufactured by additive manufacturing, includes a first continuous contour of polymer deposited by fused-deposition-modeling that defines an underlying base layer formed with adjoining portions of the first continuous contour fused to both radially inward and radially outward portions of the first continuous contour. Also included is a second continuous contour of polymer deposited by fused-deposition-modeling that is positioned over the underlying base layer formed with adjoining portions of the second continuous contour fused to radially inward and radially outward portions of the second continuous contour and fused to the underlying base layer. Further included is a plug at a center of airtight cap structure sealing a gap between a radially inner most butt-end of the first and second continuous contours and adjoining portions of the first and second continuous contours. For the disclosed airtight cap structure, contours describe a spiral with sections of the second continuous contour directly overlying sections of the underlying base layer. The disclosed airtight cap structure further includes at least a radially outmost ring of the continuous contour with a tapered polymer deposit that it fuses with an adjoining radially inward portion of the continuous contour. In some cases, contours describe a spiral with sections of the second continuous contour centered between sections of the underlying base layer. In other cases, contours describe a polygon with sections of the second continuous contour directly overlying sections of the underlying base layer. In yet other cases, contours describe a polygon with sections of the second continuous contour centered between sections of the underlying base layer.

In one implementation, a disclosed method of creating an insulating structure, by additive manufacturing of securely self-supporting cantilevered structures that define essentially closed cells, includes depositing, by fused-deposition-modeling, first and second base contours; building contours into first and second self-supporting-cantilevered contour structures, by fused-deposition-modeling, over the first and second base contours, respectively, in repeating patterns. Each contour in a layer of a self-supporting-cantilevered contour structure overlays an immediately underlying layer, is fused in contact with the contour in the immediately underlying layer, and overlaps the contour in the immediately underlying layer by at least 40 percent of the overlaying contour's width. Curvature—indicated by a second derivative of a spline through minimum and maximum pattern extents of the first and second self-supporting-cantilevered contour structures, along axes of variation in the pattern extents—repeatedly varies between positive and negative; and the repeating patterns of the first and second self-supporting-cantilevered contour structures intersect, forming essentially closed cells, in which convection of enclosed gas within the essentially closed cells is insulated from ambient gas circulation. In some implementations of the disclosed method, the first self-supporting-cantilever contour structure defines a pattern that includes sinusoidal variation. In some cases, the axis of the sinusoidal variation defined by the first self-supporting-cantilever contour structure is essentially horizontal. In other cases, the axis of the sinusoidal variation defined by the first self-supporting-cantilever contour structure is essentially vertical. In some cases, the second self-supporting-cantilever contour structure defines a pattern that includes sinusoidal variation and axes of the sinusoidal variations of the first and second self-supporting-cantilever contour structures are essentially orthogonal. In some implementations of the disclosed method, the first self-supporting-cantilever contour structure defines a pattern that includes one side of a regular solid. In some cases, a major axis of the regular solid partially defined by the first self-supporting-cantilever contour structure is essentially horizontal. In other implementations, a major axis of the regular solid partially defined by the first self-supporting-cantilever contour structure is essentially vertical. In some cases, the regular solid is a cube. In other cases, the regular solid is an ellipsoid. The second self-supporting-cantilever contour structure defines a pattern that includes a second side of the regular solid and mated patterns of the first and second self-supporting-cantilever contour structures complete the regular solid. Some implementations of the disclosed method further include defining a vent hole as a gap in at least one contour of the essentially closed cell.

In one implementation, a disclosed slicer server generates a build file for creating an insulating structure of polymer material deposited by fused-deposition-modeling, wherein the slicer server includes a processor and memory coupled to the processor, the memory holding instructions that, when executed on the processor, cause the slicer server to accept input that specifies a contour cross-section or range of contour cross-sections for material to deposit by fused-deposition-modeling, and a geometry of the insulating structure that includes repeating first and second patterns of self-supporting-cantilevered contour structures with curvatures, indicated by a second derivative of a spline through minimum and maximum pattern extents of the first and second self-supporting-cantilevered contour structures, along axes of variation in the pattern extents, repeatedly vary between positive and negative and the repeating patterns of the first and second self-supporting-cantilevered contour structures intersect, forming essentially closed cells. Instructions executed on the processor cause the disclosed slicer server to further automatically lay out tool paths and deposition parameters that specify deposition of contours that define first and second self-supporting-cantilevered contour structures; wherein each contour in a layer of a self-supporting-cantilevered contour structure overlays an immediately underlying layer, is fused in contact with the contour in the immediately underlying layer, and overlaps the contour in the immediately underlying layer by at least 40 percent of the overlaying contour's width. Additionally, the automatic layout of tool paths in a respective layer includes a continuous line of contour in the respective layer and segmentation of an intersecting line of contour that forms butt joints with the continuous line of contour in the respective layer; and output a build file containing the layout of the tool paths and the deposition parameters for building the insulating structure with the essentially closed cells, in which convection of enclosed gas within the essentially closed cells is insulated from ambient gas circulation. In some implementations, the first self-supporting-cantilever contour structure defines a pattern that includes sinusoidal variation. In some cases, the axis of the sinusoidal variation defined by the first self-supporting-cantilever contour structure is essentially horizontal. In other cases, the axis of the sinusoidal variation defined by the first self-supporting-cantilever contour structure is essentially vertical. In some implementations, the second self-supporting-cantilever contour structure defines a pattern that includes sinusoidal variation and axes of the sinusoidal variations of the first and second self-supporting-cantilever contour structures are essentially orthogonal. In some cases, the first self-supporting-cantilever contour structure defines a pattern that includes one side of a regular solid. In other cases, a major axis of the regular solid partially defined by the first self-supporting-cantilever contour structure is essentially horizontal. In yet other cases, a major axis of the regular solid partially defined by the first self-supporting-cantilever contour structure is essentially vertical. In some cases, the regular solid is a cube. In other cases, the regular solid is an ellipsoid. In some cases, the second self-supporting-cantilever contour structure defines a pattern that includes a second side of the regular solid and mated patterns of the first and second self-supporting-cantilever contour structures complete the regular solid. In some implementations, the slicer server includes input that specifies a vent hole in the essentially closed cell and the automatic layout of tool paths implements the vent hole as a gap in at least one contour of the essentially closed cell.

In yet another implementation, a disclosed insulating structure, manufactured by additive manufacturing, includes first and second base contours of polymer deposited by fused-deposition-modeling; first and second self-supporting-cantilevered contour structures defining repeating patterns, deposited by fused-deposition-modeling over the first and second base contours. Curvature, indicated by a second derivative of a spline through minimum and maximum pattern extents of the first and second self-supporting-cantilevered contour structures, along axes of variation in the pattern extents, repeatedly varies between positive and negative. The repeating patterns of the first and second self-supporting-cantilevered contour structures intersect, forming essentially closed cells, in which convection of enclosed gas within the essentially closed cells is insulated from ambient gas circulation. Each contour in a layer of a self-supporting-cantilevered contour structure overlays an immediately underlying layer, is fused in contact with the contour in the immediately underlying layer, and overlaps the contour in the immediately underlying layer by at least 40 percent of the overlaying contour's width.

In some implementations, the first self-supporting-cantilever contour structure defines a pattern that includes sinusoidal variation. In some cases, the axis of the sinusoidal variation defined by the first self-supporting-cantilever contour structure is essentially horizontal. In other cases, the axis of the sinusoidal variation defined by the first self-supporting-cantilever contour structure is essentially vertical. In some implementations, the second self-supporting-cantilever contour structure defines a pattern that includes sinusoidal variation and axes of the sinusoidal variations of the first and second self-supporting-cantilever contour structures are essentially orthogonal. In some cases, the first self-supporting-cantilever contour structure defines a pattern that includes one side of a regular solid. In other cases, a major axis of the regular solid partially defined by the first self-supporting-cantilever contour structure is essentially horizontal. In yet other cases, a major axis of the regular solid partially defined by the first self-supporting-cantilever contour structure is essentially vertical. In some cases, the regular solid is a cube. In other cases, the regular solid is an ellipsoid. In some implementations, the second self-supporting-cantilever contour structure defines a pattern that includes a second side of the regular solid and mated patterns of the first and second self-supporting-cantilever contour structures complete the regular solid. Some implementations of the insulating structure further include defining a vent hole as a gap in at least one contour of the essentially closed cell.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of creating an airtight cap structure, by additive manufacturing, including:
    depositing, by fused-deposition-modeling, a base layer with at least two abutting contours forming a perimeter of a structure and defining a contained gap;
    depositing by fused-deposition-modeling an initial cantilevered layer with at least two abutting contours over the base layer, wherein one contour in the initial cantilevered layer
        spans the two abutting contours of the base layer,
        overlaps each of the two abutting contours of the base layer by at least 40 percent of a width of the one contour, and
        is fused in contact with both of the abutting contours of the base layer;
    depositing by fused-deposition-modeling additional cantilevered layers with at least two abutting contours over the base layer, wherein the additional cantilevered layers
        overlaps each of the two abutting contours of immediately underlying layers by at least 40 percent of a width of the one contour,
        are fused to the immediately underlying layers and
        decrease the contained gap between the abutting contours in the base layer; and
    depositing by fused-deposition-modeling an upper enclosing cantilevered layer over an upper additional cantilevered layer wherein the contained gap is sealed by the enclosing cantilevered layer.

2. The method of claim 1, wherein the upper enclosing layer includes four abutting contours.

3. The method of claim 2, further including doubling the upper enclosing cantilevered layer, including:
    depositing by fused-deposition-modeling in a step layer a pair of non-abutting step contours that each overlap two abutting contours of the upper enclosing cantilevered layer; and depositing by fused-deposition-modeling a doubling cantilevered layer of at least two abutting contours over the pair of non-abutting step contours that double seals the contained gap.

4. The method of claim 1, further including:

in the base layer, depositing multiple pairs of abutting contours, one pair enclosing an other pair, defining at least two contained gaps; and in the additional cantilevered layers, depositing by fused-deposition-modeling multiple pairs of the abutting contours over and fused to immediately underlying multiple pairs, wherein the multiple pairs in a cantilevered layer decrease the contained gaps.

5. The method of claim 1, wherein at least one pair of abutting contours includes two concentric contours with non-aligned end butts.

6. The method of claim 5, further including radially distributing end-butt joints in the concentric contours to avoid alignment between the end-butt joints in both vertically and horizontally adjoining concentric contours.

7. The method of claim 1, wherein at least one pair of abutting contours is formed by a continuous spiral extrusion.

8. The method of claim 1, further including defining one or more vents in the airtight cap structure with gaps in the deposited contours.

9. An airtight cap structure, manufactured by additive manufacturing, applying the method of claim 1.

10. An airtight cap structure, manufactured by additive manufacturing, applying the method of claim 2.

11. An airtight cap structure, manufactured by additive manufacturing, applying the method of claim 3.

12. An airtight cap structure, manufactured by additive manufacturing, applying the method of claim 4.

13. An airtight cap structure, manufactured by additive manufacturing, applying the method of claim 5.

14. An airtight cap structure, manufactured by additive manufacturing, applying the method of claim 6.

15. An airtight cap structure, manufactured by additive manufacturing, applying the method of claim 7.

16. An airtight cap structure, manufactured by additive manufacturing, applying the method of claim 8.

* * * * *